US012750489B2

(12) United States Patent
Yang et al.

(10) Patent No.: US 12,750,489 B2
(45) Date of Patent: Sep. 29, 2026

(54) METHOD FOR INDEX DETERMINATION, DECODER, ENCODER, AND BITSTREAM

(71) Applicant: GUANGDONG OPPO MOBILE TELECOMMUNICATIONS CORP., LTD., Dongguan (CN)

(72) Inventors: Fuzheng Yang, Dongguan (CN); Ming Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/904,425

(22) Filed: Oct. 2, 2024

(65) Prior Publication Data

US 2025/0024041 A1 Jan. 16, 2025

Related U.S. Application Data

(63) Continuation of application No. PCT/CN2022/087244, filed on Apr. 16, 2022.

(51) Int. Cl.
*H04N 19/136* (2014.01)

(52) U.S. Cl.
CPC .................................. *H04N 19/136* (2014.11)

(58) Field of Classification Search
CPC ....... H04N 19/136; H04N 19/16; H04N 19/13
See application file for complete search history.

(56) References Cited

U.S. PATENT DOCUMENTS

2021/0407143 A1 12/2021 Van Der et al.
2024/0029313 A1* 1/2024 Hur ........................ H04N 19/93

FOREIGN PATENT DOCUMENTS

CN 111247802 A 6/2020
CN 112565795 A 3/2021
CN 113473127 A * 10/2021 ............. H04N 19/96
WO 2022035256 A1 2/2022

OTHER PUBLICATIONS

G-PCC codec description, v12, 21244 (ISO/IEC JTC 1/SC 29/WG 7 N 00271, Jan. 2022) (Year: 2022).*
MPEG G-PCC.*
WIPO, International Search Report and Written Opinion for International Application No. PCT/CN2022/087244 mailed on Jan. 11, 2023, 15 pages with English translation.

* cited by examiner

*Primary Examiner* — Shadan E Haghani
(74) *Attorney, Agent, or Firm* — Sheppard, Mullin, Richter & Hampton LLP

(57) ABSTRACT

Embodiments of the disclosure provide a method for index determination, a decoder, an encoder, and a bitstream. The method includes the following. A first index of a current node is determined based on occupied child nodes of at least one decoded neighbouring node of the current node on a plane perpendicular to a k-th axis.

16 Claims, 10 Drawing Sheets

METHOD FOR INDEX DETERMINATION, DECODER, ENCODER, AND BITSTREAM

CROSS REFERENCE TO RELATED APPLICATION(S)

This application is a continuation of International Application No. PCT/CN2022/087244, filed Apr. 16, 2022, the entire disclosure of which is incorporated herein by reference.

TECHNICAL FIELD

Embodiments of the disclosure relate to the field of coding technologies, and more specifically to a method for index determination, a decoder, an encoder, and a bitstream.

BACKGROUND

Point cloud has begun to gain popularity in various fields, such as virtual/augmented reality, robots, geographic information systems, medical fields, and the like. With the continuous improvement of a reference degree and a speed of a scanning device, a large volume of point cloud on a surface of an object can be accurately acquired, where one scenario may often correspond to hundreds of thousands of points. Such a large number of points also bring challenges to storage and transmission for a computer. Therefore, compression of points has become a hot issue.

For the compression of the point cloud, location information and attribute information of the point cloud mainly need to be compressed. Specifically, an encoder first obtains partitioned nodes through octree partitioning of the location information of the point cloud, and then performs arithmetic encoding on a current node to be encoded, so as to obtain a geometry bitstream. In addition, according to octree-partitioned location information of a current point, the encoder selects from encoded points a point(s) for obtaining a predicted value of attribute information of the current point, and then predicts the attribute information of the current point based on the selected point(s). Then, the encoder encodes the attribute information according to a difference between an original value and the predicted value of the attribute information, so as to obtain an attribute bitstream of the point cloud.

In the arithmetic encoding process, the encoder can use spatial correlation between the current node to be encoded and surrounding nodes for intra prediction of occupancy bits to obtain an index of the current node. Then, the encoder performs arithmetic encoding based on the index of the current node, so as to implement context-based adaptive binary arithmetic coding (CABAC) and thus obtain the geometry bitstream.

However, in the related art, the accuracy of the determination of the index of the current node is low, and thus the coding performance is reduced.

SUMMARY

In a first aspect, a method for index determination is provided in the disclosure. The method includes the following. A first index of a current node is determined based on occupied child nodes of at least one decoded neighbouring node of the current node on a plane perpendicular to a k-th axis.

In a second aspect, a method for index determination is provided in the disclosure. The method includes the following. A first index of a current node is determined based on occupied child nodes of at least one encoded neighbouring node of the current node on a plane perpendicular to a k-th axis.

In a third aspect, a decoder is provided in the disclosure. The decoder includes a processor and a computer-readable storage medium. The processor is adapted to execute a computer program. The computer-readable storage medium stores the computer program which, when executed by the processor, is operable to implement the method in the first aspect.

In a fourth aspect, an encoder is provided in the disclosure. The encoder includes a processor and a computer-readable storage medium. The processor is adapted to execute a computer program. The computer-readable storage medium stores the computer program which, when executed by the processor, is operable to implement the method in the second aspect.

In a fifth aspect, a bitstream generated according to the method in the second aspect is provided in the disclosure.

DETAILED DESCRIPTION

The following will describe technical solutions of embodiments of the disclosure with reference to the accompanying drawings.

Figure 1:
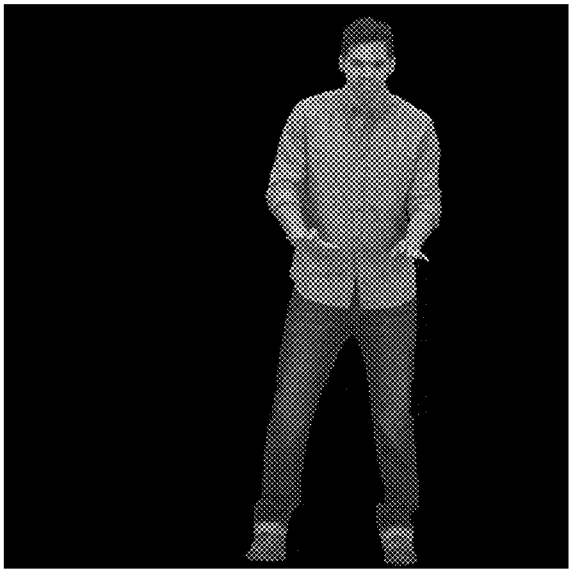
FIG. 1 is an example of a point cloud picture provided in embodiments of the disclosure.
Figure 2:
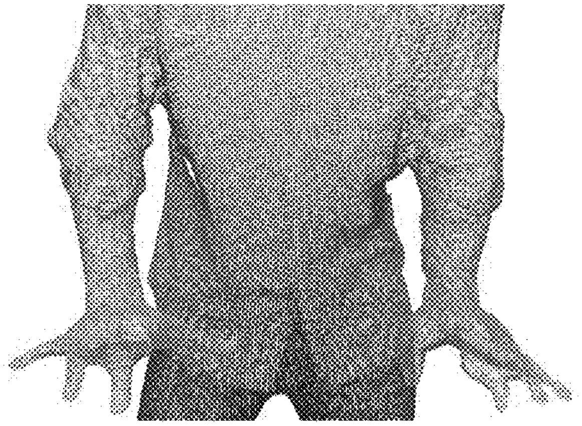
FIG. 2 is a partially enlarged view of the point cloud picture illustrated in FIG. 1.

Point cloud is a collection of irregularly-distributed discrete points in space that represent the spatial structure and surface attributes of a three-dimensional (3D) object or a 3D scene. FIG. 1 and FIG. 2 illustrate a 3D point cloud picture and a partially enlarged view respectively, and as can be seen, a surface of the point cloud is composed of densely-distributed points.

Since a two-dimensional (2D) picture has information representation at each pixel, location information thereof does not need to be recorded additionally. However, since points in the point cloud are distributed randomly and irregularly in a 3D space, a location of each point in the space needs to be recorded, so that the point cloud can be represented completely. Similar to the 2D picture, each point in the point cloud has corresponding attribute information, that is, usually a red green blue (RGB) color value. A color value reflects a color of an object. For the point cloud, in addition to colors, the attribute information corresponding to each point may be a reflectance value. The reflectance value reflects a surface material of an object. Each point in the point cloud may have geometry information and attribute information. The geometry information of each point in the point cloud refers to Cartesian 3D coordinate data of the point. The attribute information of each point in the point cloud may include, but is not limited to, at least one of color information, material information, or laser reflectance information. The color information may be information on any color space. For example, the color information may be RGB information. For another example, the color information may also be luminance-chrominance (YCbCr, YUV) information, where Y represents brightness (Luma), Cb (U) represents a blue chroma component, and Cr (V) represents a red chroma component. All points in the point cloud have the same amount of attribute information. For example, each point in the point cloud has two types of attribute information, i.e., the color information and laser reflectance. For another example, each point in the point cloud has three types of attribute information, i.e., the color information, the material information, and the laser reflectance information.

Figure 3:
FIG. 3 is an example of a point cloud picture provided in embodiments of the disclosure, viewed from six directions.

A point cloud picture may be viewed from multiple directions. For example, as illustrated in FIG. 3, the point cloud picture may be viewed from six directions. A data storage format of the point cloud picture consists of header information and data. The header information contains a data format, a data representation type, the total point number of the point cloud, and the content represented by the point cloud.

The point cloud can represent the spatial structure and surface attributes of the 3D object or scene in a flexible and convenient manner. In addition, since the point cloud is acquired by directly sampling a real object, which can exhibit an extremely realistic effect on the premise of ensuring accuracy, the point cloud has a wide range of application, including virtual reality games, computer-aided design, geographic information systems, autonomous navigation systems, digital cultural heritage, free point-of-view broadcasting, 3D immersive telepresence, 3D reconstruction of biological tissues and organs, and the like.

Exemplarily, based on application scenarios, point clouds may be classified into two categories, i.e., a machine perception point cloud and a human eye perception point cloud. Application scenarios of the machine perception point cloud include, but are not limited to, autonomous navigation systems, real-time inspection systems, geographic information systems, visual sorting robots, rescue and disaster relief robots, and other point cloud application scenarios. Application scenarios of the human eye perception point cloud include, but are not limited to, digital cultural heritage, free point-of-view broadcasting, 3D immersive communication, 3D immersive interaction, and other point cloud application scenarios. Correspondingly, point clouds may be classified into a dense point cloud and a sparse point cloud based on methods for acquiring the point clouds. Point clouds may also be classified into a static point cloud and a dynamic point cloud based on manners for acquiring the point clouds, and more specifically, the point clouds may be classified into three types of point clouds, i.e., a first-type static point cloud, a second-type dynamic point cloud, and a third-type dynamically-acquired point cloud. For the first-type static point cloud, the object is stationary, and the device for acquiring the point cloud is also stationary. For the second-type dynamic point cloud, the object is in motion, but the device for acquiring the point cloud is stationary. For the third-type dynamically-acquired point cloud, the device for acquiring the point cloud is in motion.

Exemplarily, a manner for capturing the point cloud includes, but is not limited to computer generation, 3D laser scanning, 3D photogrammetry, or the like. Point cloud of a virtual 3D object or scene may be generated by the computer. Point cloud of a 3D object or scene in a static real world may be acquired through 3D laser scanning, with millions of points acquired every second. Point cloud of a 3D object or scene in a dynamic real world may be acquired through 3D photogrammetry, with tens of millions of points acquired every second. Specifically, the point cloud of the surface of the object can be captured by a capturing equipment such as a photoelectric radar, a laser radar, a laser scanner, and a multi-view camera. The point cloud acquired according to a laser measurement principle may include 3D coordinate information of the point and laser reflectance of the point. The point cloud acquired according to a photogrammetry principle may include 3D coordinate information of the point and color information of the point. The point cloud acquired according to the laser measurement principle and the photogrammetry principle may include 3D coordinate information of the point, laser reflectance of the point, and color information of the point. These technologies have reduced the acquisition cost and the time period of point cloud data, and improved the accuracy of the data. For example, in medical fields, point clouds of biological tissues and organs can be acquired through magnetic resonance imaging (MRI), computed tomography (CT), and electromagnetic positioning information. These technologies have reduced the acquisition cost and the time period of point cloud data, and improved the accuracy of the data. The transformation of the method for acquiring point cloud data makes it possible to acquire a large amount of point cloud data. With an increase in application demand, the processing of massive 3D point cloud data is constrained by storage space and transmission bandwidth.

For example, a point cloud video has a frame rate of 30 frames per second (fps). The number of points in each frame of point cloud is 700 thousand. Each point in each frame of point cloud has coordinate information xyz (float) and color information RGB (uchar). In this case, a 10 s point cloud video has a data volume of approximately 3.15 GB (0.7 million·×(4 Byte·×3+1 Byte×·3)×30 fps×10 s=3.15 GB). For a 1280×720 2D video with a YUV sampling format of 4:2:0 and a frame rate of 24 fps, the data volume of the 10 s video is approximately 0.33 GB (1280×720×12 bit×24 frames×10 s=0.33 GB). A 10 s two-view 3D video has a data volume of approximately 0.66 GB (0.33×2=0.66 GB). As can be seen, the data volume of the point cloud video is much greater than the data volume of the 2D video and the data volume of the 3D video with the same duration. Therefore, in order to better achieve data management, save storage space of a server, and reduce transmission traffic and transmission time between the server and a client, point cloud compression has become a key issue to promote the development of point cloud industry.

Generally, for the compression of the point cloud, geometry information and attribute information of the point cloud are compressed separately. At an encoding end, the geometry information of the point cloud is first encoded in a geometry encoder. Then, reconstructed geometry information is inputted as additional information into an attribute encoder, so as to assist attribute compression of the point cloud. At a decoding end, the geometry information of the point cloud is first decoded in a geometry decoder. Then, decoded geometry information is inputted as additional information into an attribute decoder, so as to assist attribute compression of the point cloud. The whole encoder/decoder consists of the following parts: pre-processing/post-processing, geometry encoding/decoding, and attribute encoding/decoding.

Exemplarily, the point cloud may be encoded and decoded respectively by various types of encoding frameworks and decoding frameworks. As an example, the coding framework may be a geometry point cloud compression (G-PCC) coding framework or a video point cloud compression (V-PCC) coding framework provided by the moving picture experts group (MPEG), and may also be an audio video standard (AVS)-PCC coding framework or a point cloud reference model (PCRM) framework provided by an AVS special interest group. The G-PCC coding framework may be used for compressing the first-type static point cloud and the third-type dynamically-acquired point cloud. The V-PCC coding framework may be used for compressing the second-type dynamic point cloud. The G-PCC coding framework is also referred to as the point cloud coder TMC13, and the V-PCC coding framework is also referred to as the point cloud coder TMC2. Both the G-PCC and the AVS-PCC are aimed at the static and sparse point cloud, and encoding frameworks thereof are substantially the same.

The G-PCC framework is taken below as an example for illustrating a coding framework applicable to embodiments of the disclosure.

In the G-PCC encoding framework, an input point cloud is first partitioned into slices, and then the resulting slices are encoded independently. In a slice, geometry information of the point cloud and attribute information corresponding to points in the point cloud are encoded separately. In the G-PCC encoding framework, the geometry information is encoded first. Specifically, coordinate conversion is first performed on the geometry information, so that the whole point cloud is contained in a bounding box. This is followed by quantization, which is mainly a scaling process. Due to rounding in the quantization, some of the points have the same geometry information. Whether to remove duplicate points is determined according to parameters. The process of quantization and removing the duplicate points is also known as voxelization. Next, octree-based partitioning is performed on the bounding box. Depending on the depth of the octree partitioning, encoding of the geometry information may be based on an octree-based framework for geometry information encoding and a triangle soup (trisoup)-based framework for geometry information encoding.

In the octree-based framework for geometry information encoding, the bounding box is first octeted into 8 sub-cubes and occupancy bits of the sub-cubes are recorded (where 1 represents non-empty and 0 represents empty). The non-empty sub-cubes are continued to be octeted, generally until a resulting leaf node is a 1×1×1 unit cube. In this process, spatial correlation between a node and surrounding nodes is used for intra prediction of the occupancy bits. Then, a corresponding binary arithmetic encoder is selected for arithmetic encoding based on a predicted result, so as to implement context-based adaptive binary arithmetic coding (CABAC) and generate a binary bitstream.

In the trisoup-based framework for geometry information encoding, the octree partitioning is also performed first. However, different from the octree-based framework for geometry information encoding, in the trisoup-based framework for geometry information encoding, instead of partitioning the point cloud layer-by-layer into 1×1×1 unit cubes, the partitioning is stopped when the side length of a block is W. Based on a surface formed by distribution of the point cloud in each block, up to 12 vertexes generated between the 12 edges of the block and the surface are obtained. Then, coordinates of the vertexes of each block are encoded in sequence and thus the binary bitstream is generated.

In the G-PCC encoding framework, after encoding of the geometry information is completed, the geometry information is reconstructed, and the reconstructed geometry information is used to encode the attribute information of the point cloud. Attribute encoding of the point cloud is focused on encoding of color information of the points in the point cloud. First, in the G-PCC encoding framework, color-space conversion may be performed on the color information of the points. For example, when the color information of the points in the input point cloud is represented using the RGB color space, the color information may be converted from the RGB color space to the YUV color space in the G-PCC encoding framework. The reconstructed geometry information is then used in the G-PCC encoding framework to recolor the point cloud, so as to make the uncoded attribute information correspond to the reconstructed geometry information. In encoding of the color information, there are two main transform methods, that is, a distance-based lifting transform that relies on level of detail (LOD) partitioning and a direct region adaptive hierarchal transform (RAHT), both of which transform the color information from the spatial domain to the frequency domain to obtain high-frequency coefficients and low-frequency coefficients, and finally quantize and encode the coefficients to generate the binary bitstream.

Figure 4:
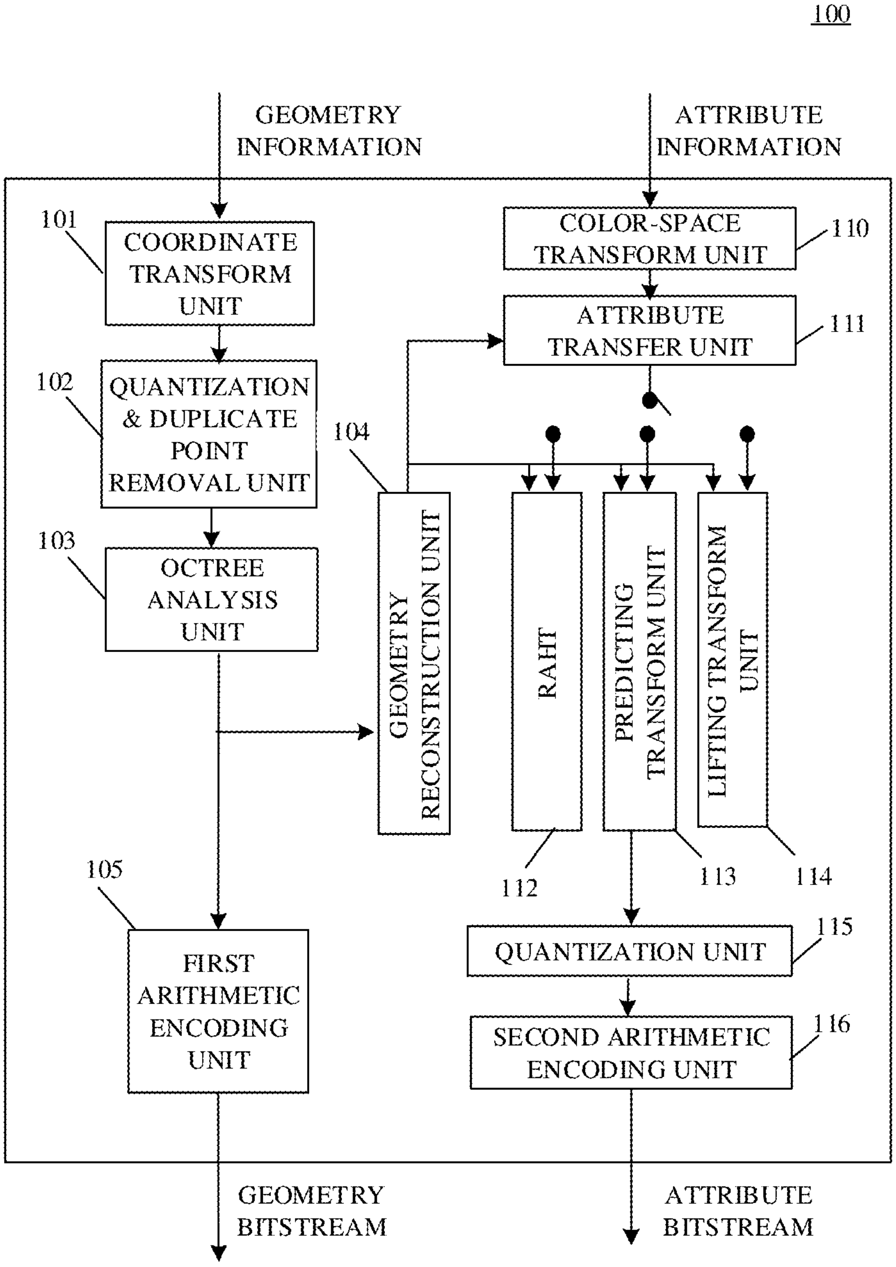
FIG. 4 is a schematic block diagram of an encoding framework provided in embodiments of the disclosure.

FIG. 4 is a schematic block diagram of an encoding framework provided in embodiments of the disclosure.

As illustrated in FIG. 4, in the encoding framework 100, location information and attribute information of a point cloud can be obtained from a capturing equipment. The encoding of the point cloud includes location encoding and attribute encoding. In an embodiment, the process of location encoding includes the following. Pre-processing such as coordinate transform as well as quantization and removal of duplicate points is performed on an original point cloud, and encoding is performed after construction of an octree to form a geometry bitstream.

As illustrated in FIG. 4, the location encoding at an encoder can be implemented with the following units: a coordinate transform unit 101, a quantization and duplicate point removal unit 102, an octree analysis unit 103, a geometry reconstruction unit 104, and a first arithmetic encoding unit 105.

The coordinate transform unit 101 is configured to transform world coordinates of a point in the point cloud to relative coordinates. For example, the minimum values of coordinate axes x, y, and z are respectively subtracted from geometry coordinates of the point, which is equivalent to a de-direct current operation, so that coordinates of the point in the point cloud are transformed from world coordinates to relative coordinates, and the whole point cloud is contained in a bounding box. The quantization and duplicate point removal unit 102 is configured to reduce the number of coordinates through quantization. After quantization, originally different points may be given the same coordinates, and based on this, duplicate points can be removed by a de-duplication operation. For example, multiple points with the same quantized location and different attribute information can be merged into one point through attribute transfer. In some embodiments of the disclosure, the quantization and duplicate point removal unit 102 is an optional unit module. The octree analysis unit 103 can encode quantized location information of points through octree encoding. For example, regularization processing is performed on the point cloud in the form of an octree, so that locations of the points may be in a one-to-one correspondence with locations in the octree. Locations of occupied nodes in the octree are determined and flags thereof are set to 1, to perform geometry encoding. The first arithmetic encoding unit 105 can perform arithmetic encoding on the location information output by the octree analysis unit 103 through entropy encoding, i.e., the geometry bitstream is generated through arithmetic encoding of the location information output by the octree analysis unit 103. The geometry bitstream can also be called a geometry bit stream.

A regularization processing method for the point cloud will be explained below.

Figure 5:
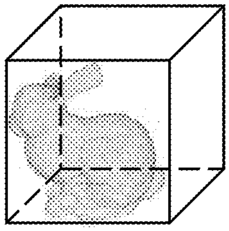
FIG. 5 is an example of a bounding box provided in embodiments of the disclosure.

Since the point cloud is characterized by irregular distribution in space, which brings challenges to the encoding process, a recursive octree structure is used to represent points in the point cloud as a center of a cube by regularization. For example, as illustrated in FIG. 5, the whole point cloud may be placed inside a cubic bounding box. In this case, coordinates of a point in the point cloud may be represented as ($x^k$, $y^k$, $z^k$), where k=0, . . . , K−1, and K is the total point number of the point cloud. Boundary values of the point cloud in x-axis, y-axis, and z-axis directions are respectively as follows:

$$x^{min}=\min(x^0, x^1, \ldots, x^{K-1});$$
$$y^{min}=\min(y^0, y^1, \ldots, y^{K-1});$$
$$z^{min}=\min(z^0, z^1, \ldots, z^{K-1});$$
$$x^{max}=\max(x^0, x^1, \ldots, x^{K-1});$$
$$y^{max}=\max(y^0, y^1, \ldots, y^{K-1});$$
$$z^{max}=\max(z^0, z^1, \ldots, z^{K-1}).$$

In addition, origins ($x^{origin}$, $y^{origin}$, $z^{origin}$) of the bounding box may be calculated as follows:

$$x^{origin}=\text{int}(\text{floor}(x^{min}));$$
$$y^{origin}=\text{int}(\text{floor}(y^{min}));$$
$$z^{origin}=\text{int}(\text{floor}(z^{min})).$$

In the above, floor( ) represents a floor operation or a rounding-down operation, and int( ) represents a rounding operation.

Based on this, the encoder can calculate sizes of the bounding box in the x-axis, y-axis, and z-axis directions based on the calculation formulas of the boundary values and origins as follows:

$$\text{BoudingBoxSize\_x}=\text{int}(x^{max}-x^{origin})+1;$$
$$\text{BoudingBoxSize\_y}=\text{int}(y^{max}-y^{origin})+1;$$
$$\text{BoudingBoxSize\_z}=\text{int}(z^{max}-z^{origin})+1.$$

Figure 6:
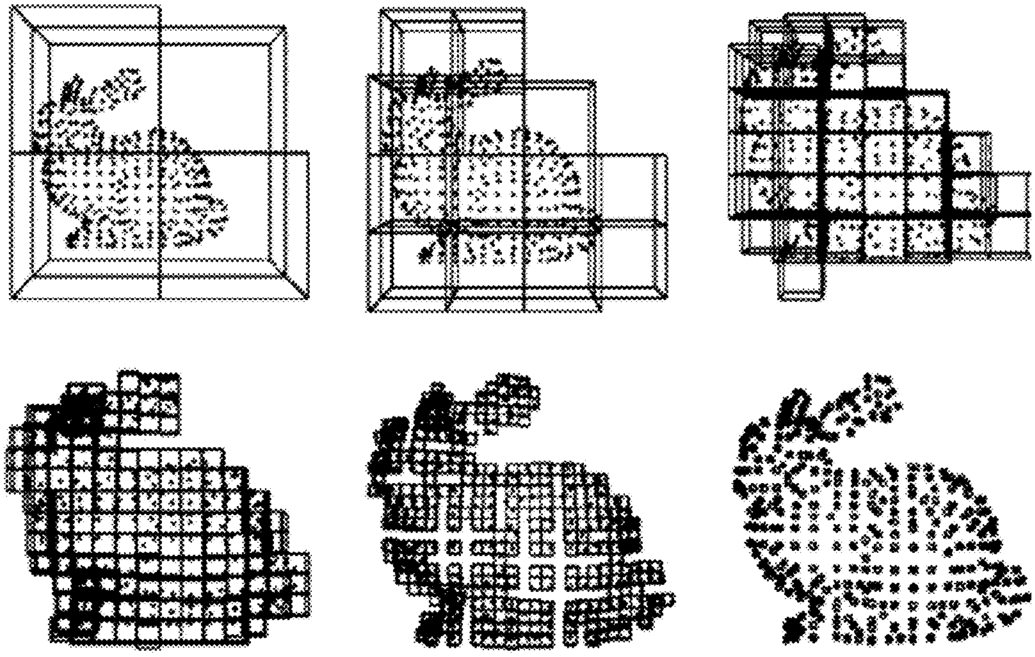
FIG. 6 is an example illustrating octree partitioning of a bounding box provided in embodiments of the disclosure.

As illustrated in FIG. 6, after obtaining the sizes of the bounding box in the x-axis, y-axis, and z-axis directions, the encoder first performs octree partitioning on the bounding box to obtain eight sub-blocks each time, and then performs octree partitioning on a non-empty block (block containing a point(s)) in the sub-blocks again. In this way, recursive partitioning is performed up to some depth. A non-empty sub-block of a final size is referred to as a voxel, and each voxel contains one or more points. Geometry locations of these points are normalized to a central point of the voxel, and an attribute value of the central point is an average of attribute values of all points in the voxel. The regularization of the point cloud into blocks in space facilitates the description of location relationships among points in the point cloud and thus facilitates the design of a specific encoding order. Based on this, the encoder can encode each voxel based on the determined encoding order, i.e., encode a point (or referred to as a "node") represented by each voxel.

After completion of geometry encoding, the encoder reconstructs geometry information and encodes attribute information using the reconstructed geometry information. The process of attribute encoding includes the following. According to reconstructed information of location information and true values of attribute information of a given input point cloud, one of three prediction modes is selected for point cloud prediction, the predicted result is quantized, and arithmetic encoding is performed, so as to form an attribute bitstream.

As illustrated in FIG. 4, the attribute encoding at the encoder can be implemented with the following units: a color-space transform unit 110, an attribute transfer unit 111, a region adaptive hierarchical transform (RAHT) unit 112, a predicting transform unit 113, and a lifting transform unit 114, a quantization unit 115, and a second arithmetic encoding unit 116.

The color-space transform unit 110 is configured to transform the points in the point cloud from an RGB color space to a YCbCr format or other formats. The attribute transfer unit 111 is configured to transfer the attribute information of the points in the point cloud to minimize attribute distortion. For example, in the case of lossy geometry encoding, since the geometry information varies after geometry encoding, the attribute transfer unit 111 needs to reassign an attribute value to each point that is subject to geometry encoding, so that an attribute error between the reconstructed point cloud and the original point cloud is minimized. For example, the attribute information may be color information of the points. The attribute transfer unit 111 is configured to obtain original attribute values of the points. After the original attribute values of the points are obtained through transfer by the attribute transfer unit 111, any prediction unit can be selected to predict the points in the point cloud. The unit for predicting the points in the point cloud may include at least one of the RAHT unit 112, the predicting transform unit 113, or the lifting transform unit 114. In other words, any one of the RAHT unit 112, the predicting transform unit 113, or the lifting transform unit 114 may be configured to predict attribute information of a point in the point cloud to obtain a predicted attribute value of the point, and further obtain a residual value of the attribute information of the point based on the predicted attribute value of the point. For example, the residual value of the attribute information of the point may be the original attribute value of the point minus the predicted attribute value of the point. The quantization unit 115 is configured to quantize the residual value of the attribute information of the point. For example, the quantization unit 115 may be configured to quantize a residual value of attribute information of a point output by the predicting transform unit 113, if the quantization unit 115 is connected to the predicting transform unit 113. For example, the residual value of the attribute information of the point output by the predicting transform unit 113 is quantized according to a quantization step size, to improve system performance. The second arithmetic encoding unit 116 may perform entropy encoding on the residual value of the attribute information of the point by means of zero run length coding, so as to obtain the attribute bitstream. The attribute bitstream may be bitstream information.

The predicting transform unit 113 is configured to obtain an original order of the point cloud and partition the point cloud into levels of detail (LODs) based on the original order of the point cloud. After obtaining the LODs of the point cloud, the predicting transform unit 113 can sequentially predict attribute information of points in the LODs to calculate residual values of the attribute information of the points, so that subsequent units can perform subsequent quantization and encoding based on the residual values of the attribute information of the points. For each point in an LOD, three neighbouring points located before a current point are found based on a search result for a neighbouring point(s) in the LOD where the current point is located, and then the current point is predicted by using a reconstructed attribute value of at least one of the three neighbouring points, so as to obtain a predicted attribute value of the current point. Based on this, a residual value of attribute information of the current point can be obtained based on the predicted attribute value of the current point and the original attribute value of the current point.

The original order of the point cloud obtained by the predicting transform unit 113 may be a sort order obtained by the predicting transform unit 113 through Morton reordering of the current point cloud. The encoder can obtain the original order of the current point cloud by reordering the current point cloud. After obtaining the original order of the current point cloud, the encoder can partition the points in the point cloud into layers according to the original order of the current point cloud, so as to obtain LODs of the current point cloud, and then predict attribute information of the points in the point cloud based on the LODs.

Figure 7:
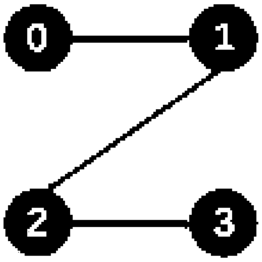
FIG. 7, FIG. 8, and FIG. 9 each illustrate a sort order of Morton codes in a two-dimensional (2D) space.
Figure 8:
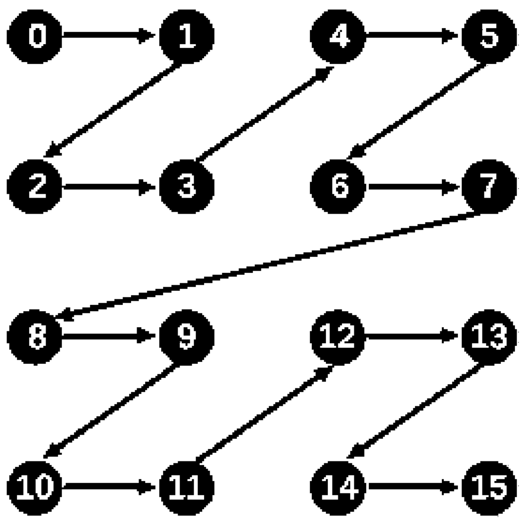
Figure 9:
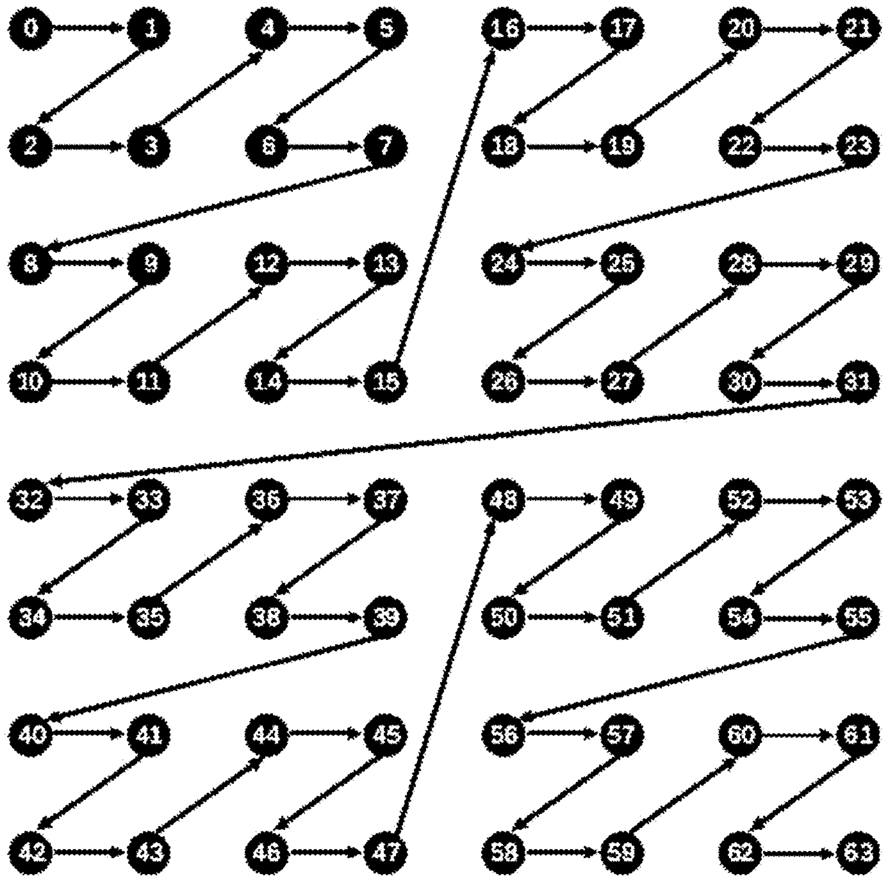

FIG. 7, FIG. 8, and FIG. 9 each illustrate a sort order of Morton codes in a 2D space.

As illustrated in FIG. 7, the encoder can use a "z-shaped" Morton sort order in a 2D space formed by 2*2 blocks. As illustrated in FIG. 8, the encoder can use a "z-shaped" Morton sort order in a 2D space formed by four 2*2 blocks, where the "z-shaped" Morton sort order can also be applied to a 2D space formed by every 2*2 blocks, and finally the Morton sort order used by the encoder in a 2D space formed by 4*4 blocks can be obtained. As illustrated in FIG. 9, the encoder can use a "z-shaped" Morton sort order in a 2D space formed by four 4*4 blocks, where the "z-shaped" Morton sort order can also be applied to a 2D space formed by every four 2*2 blocks and a 2D space formed by every 2*2 blocks, and finally the Morton sort order used by the encoder in a 2D space formed by 8*8 blocks can be obtained.

Figure 10:
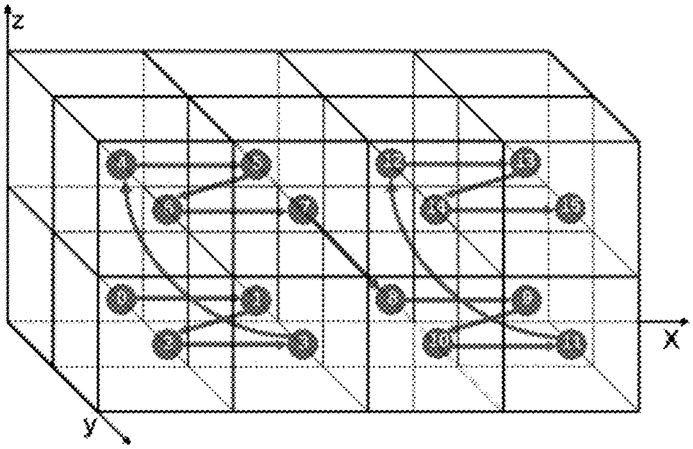
FIG. 10 illustrates a sort order of Morton codes in a three-dimensional (3D) space.

FIG. 10 illustrates a sort order of Morton codes in a 3D space.

As illustrated in FIG. 10, the Morton sort order can not only be applied to the 2D space, but also be extended into the 3D space. For example, FIG. 10 illustrates 16 points, where a Morton sort order inside each "z" and a Morton sort order between one "z" and the other "z" follow an encoding order of an x-axis direction, a y-axis direction, and finally a z-axis direction.

The generation process of the LOD includes the following. Euclidean distances among points are obtained according to location information of the points in the point cloud, and the points are divided into different LOD layers according to the Euclidean distances. In an embodiment, the Euclidean distances can be sorted and then Euclidean distances of different ranges are partitioned into different LOD layers. For example, a point can be selected randomly and divided into a first LOD layer. Then, a Euclidean distance between the point and each of remaining points is calculated, and points whose Euclidean distances satisfy a first threshold are divided into a second LOD layer. The centroid of the points in the second LOD layer is obtained, a Euclidean distance between the centroid and each point other than points in the first LOD layer and second LOD layer is calculated, and points whose Euclidean distances satisfy a second threshold are divided into a third LOD layer. The above is repeated until all the points are divided into LOD layers. The threshold of the Euclidean distance can be adjusted, so that the number of points in each LOD layer is increasing. It may be understood that, the LOD layer partitioning can also be implemented in other ways, which is not limited in the disclosure. It may be noted that, the point cloud can be directly partitioned into one or more LOD layers, or the point cloud can be first partitioned into multiple point cloud slices, and then each point cloud slice can be partitioned into one or more LOD layers. For example, the point cloud can be partitioned into multiple point cloud slices, and the number of points in each point cloud slice can range from 550,000 to 1.1 million. Each point cloud slice can be viewed as a separate point cloud. Each point cloud slice can further be partitioned into multiple LOD layers, where each LOD layer includes multiple points. In an embodiment, the LOD layer partitioning can be implemented based on the Euclidean distances among points.

Figure 11:
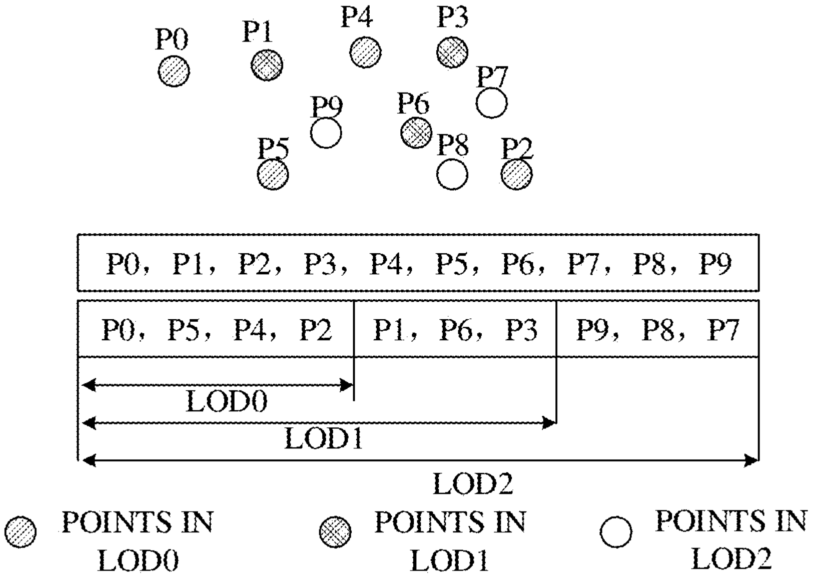
FIG. 11 is a schematic block diagram of a level of detail (LOD) layer provided in embodiments of the disclosure.

FIG. 11 is a schematic block diagram of an LOD layer provided in embodiments of the disclosure.

As illustrated in FIG. 11, it is assumed that the point cloud includes multiple points sorted in an original order, i.e., P0, P1, P2, P3, P4, P5, P6, P7, P8, and P9, and it is assumed that the point cloud can be partitioned into three LOD layers, i.e., LOD0, LOD1, and LOD2, based on Euclidean distances among points. LOD0 may include P0, P5, P4, and P2, LOD2 may include P1, P6, and P3, and LOD3 may include P9, P8, and P7. In this case, LOD0, LOD1, and LOD2 can be used to form an LOD-based order of the point cloud, i.e., P0, P5, P4, P2, P1, P6, P3, P9, P8, and P7. The LOD-based order can be used as an encoding order of the point cloud.

Exemplarily, when predicting a current point in the point cloud, the encoder creates multiple prediction-variable candidates based on a search result for a neighbouring point(s) in an LOD where the current point is located, i.e., an index of a prediction mode (predMode) (also referred to as "predictor index") may have a value from 0 to 3. For example, when encoding attribute information of the current point by using the prediction mode, the encoder first finds, based on the search result for the neighbouring point(s) in the LOD where the current point is located, three neighbouring points located before the current point. The prediction mode whose index is 0 means that a weighted average of reconstructed attribute values of the three neighbouring points based on a distance between the current point and each of the three neighbouring points is determined as a predicted attribute value of the current point. The prediction mode whose index is 1 means that a reconstructed attribute value of the $1^{st}$ nearest neighbouring point (also referred to as "$1^{st}$ nearest point") among the three neighbouring points is determined as the predicted attribute value of the current point. The prediction mode whose index is 2 means that a reconstructed attribute value of the $2^{nd}$ nearest neighbouring point (also referred to as "$2^{nd}$ nearest point") is determined as the predicted attribute value of the current point. The prediction mode whose index is 3 means that a reconstructed attribute value of a neighbouring point among the three neighbouring points other than the $1^{st}$ nearest neighbouring point and the $2^{nd}$ nearest neighbouring point is determined as the predicted attribute value of the current point. After obtaining candidates of the predicted attribute value of the current point based on the above prediction modes, the encoder can select the optimal predicted attribute value by using rate distortion optimization (RDO) technology, and then perform arithmetic encoding on the predicted attribute value selected.

Further, if the index of the prediction mode for the current point is 0, the index of the prediction mode does not need to be encoded into a bitstream. If the index of the prediction mode selected by means of the RDO is 1, 2, or 3, the index of the prediction mode selected needs to be encoded into the bitstream, that is, the index of the prediction mode selected needs to be encoded into an attribute bitstream.

TABLE 1

| Predictor index | Predicted value |
|---|---|
| 0 | average |
| 1 | P4 ($1^{st}$ nearest point) |
| 2 | P5 ($2^{nd}$ nearest point) |
| 3 | P0 ($3^{rd}$ nearest point) |

As illustrated in Table 1, when encoding the attribute information of the current point P2 by using a prediction mode, the prediction mode whose index is 0 means that a weighted average of reconstructed attribute values of neighbouring points P0, P5, and P4 based on a distance of each of the neighbouring points P0, P5, and P4 is determined as a predicted attribute value of the current point P2, the prediction mode whose index is 1 means that a reconstructed attribute value of the $1^{st}$ nearest neighbouring point P4 is determined as the predicted attribute value of the current point P2, the prediction mode whose index is 2 means that a reconstructed attribute value of the $2^{nd}$ nearest neighbouring point P5 is determined as the predicted attribute value of the current point P2, and the prediction mode whose index is 3 means that a reconstructed attribute value of the $3^{rd}$ nearest neighbouring point P0 is determined as the predicted attribute value of the current point P2.

The following will give an exemplary illustration of the RDO technology.

The encoder first calculates a maximum attribute difference maxDiff between at least one neighbouring point of the current point and compares maxDiff with a set threshold. If maxDiff is less than the set threshold, the encoder uses the prediction mode in which weighted average is performed on attribute values of the neighbouring point(s), and otherwise, the encoder selects the optimal prediction mode for the current point by using the RDO technology. Specifically, the encoder calculates the maximum attribute difference maxDiffbetween the at least one neighbouring point of the current point. For example, the encoder first calculates a maximum difference in an R component between the at least one neighbouring point of the current point, i.e., max(R1, R2, R3)−min(R1, R2, R3). Similarly, the encoder calculates a maximum difference in a G component between the at least one neighbouring point of the current point, i.e., max(G1, G2, G3)−min(G1, G2, G3) and a maximum difference in a B component between the at least one neighbouring point of the current point, i.e., max(B1, B2, B3)−min(B1, B2, B3). Then, the encoder selects the maximum difference among the maximum differences in the R, G, and B components as maxDiff, i.e., maxDiff=max(max(R1, R2, R3)−min(R1, R2, R3), max(G1, G2, G3)−min(G1, G2, G3), max(B1, B2, B3)−min(B1, B2, B3)). The encoder compares the obtained maxDiff with the set threshold. If the obtained maxDiffis less than the set threshold, then the index of the prediction mode for the current point is set to 0, i.e., predMode=0. If the obtained maxDiff is greater than or equal to the set threshold, then the encoder can determine the prediction mode for the current point by using the RDO technology. With the RDO technology, the encoder can calculate a corresponding rate-distortion cost of each prediction mode for the current point, and then select a prediction mode with the minimum rate-distortion cost, i.e., the optimal prediction mode, as an attribute prediction mode for the current point.

Exemplarily, the rate-distortion cost of the prediction mode whose index is 1, 2, or 3 can be calculated according to the following formula.

$$J_{indx\_i} = D_{indx\_i} + \lambda \times R_{indx\_i}$$

In the above, $J_{indx\_i}$ represents a rate-distortion cost when a prediction mode whose index is i is used for the current point, and D is the sum of attrResidualQuant in the three components, i.e., D=attrResidualQuant[0]+attrResidualQuant[1]+attrResidualQuant[2]. $\lambda$ is determined according to a quantization parameter (Qp) for the current point. $R_{indx\_i}$ represents the number of bits required for a quantized residual value in a bitstream, where the quantized residual value is obtained when the prediction mode whose index is i is used for the current point.

Exemplarily, after the prediction mode for the current point is determined, the encoder can determine the predicted attribute value attrPred of the current point based on the determined prediction mode, and then calculate a difference between the original attribute value attrValue of the current point and the predicted attribute value attrPred of the current point and quantize the difference, so as obtain a quantized residual value attrResidualQuant of the current point. For example, the encoder can determine the quantized residual value of the current point according to the following formula.

$$attrResidualQuant = (attrValue - attrPred)/Qstep$$

In the above, attrResidualQuant represents the quantized residual value of the current point, attrPred represents the predicted attribute value of the current point, attrValue represents the original attribute value of the current point, and Ostep represents a quantization step size. Ostep is calculated from the Qp.

Exemplarily, a reconstructed attribute value of the current point can be used as a neighbour candidate for a subsequent point, and the reconstructed value of the current point can be used to predict attribute information of the subsequent point. The encoder can determine the reconstructed attribute value of the current point based on the first quantized residual value according to the following formula.

$$Recon = attrResidualQuant \times Qstep + attrPred$$

In the above, Recon represents the reconstructed attribute value of the current point determined based on the quantized residual value of the current point, attrResidualQuant represents the quantized residual value of the current point, Ostep represents the quantization step size, and attrPred represents the predicted attribute value of the current point. Ostep is calculated from the Qp.

It may be noted that in the disclosure, the predicted attribute value (predictedvalue) of the current point may also be referred to as a predicted value of attribute information or a predicted color value (predictedColor). The original attribute value of the current point may also be referred to as a true value of attribute information of the current point or an original color value of the current point. The residual value of the current point may also be referred to as a difference between the original attribute value of the current point and the predicted attribute value of the current point, or may be referred to as a residual color value (residualColor) of the current point. The reconstructed attribute value (reconstructedvalue) of the current point may also be referred to as a reconstructed value of attribute of the current point or a reconstructed color value (reconstructedColor) of the current point.

Figure 12:
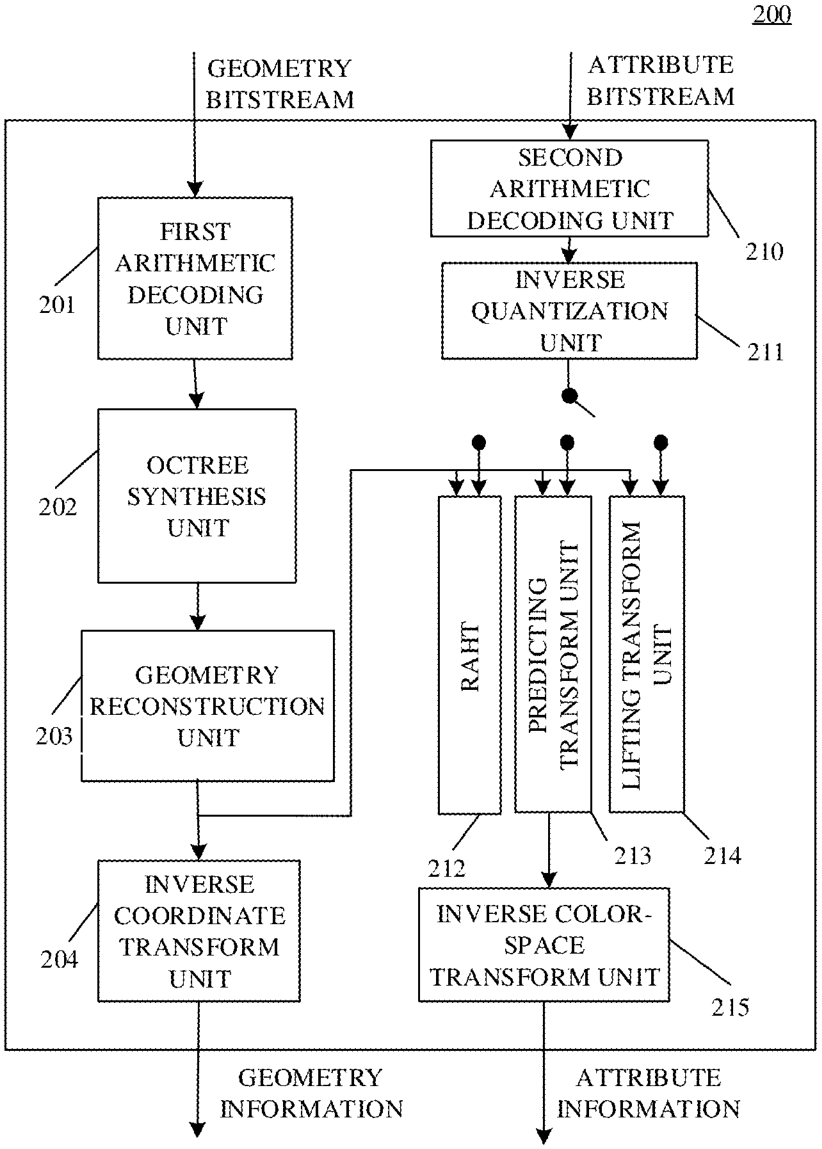
FIG. 12 is a schematic block diagram of a decoding framework provided in embodiments of the disclosure.

FIG. 12 is a schematic block diagram of a decoding framework 200 provided in embodiments of the disclosure.

In the decoding framework 200, a bitstream of a point cloud can be obtained from an encoding device, and location information and attribute information of points in the point cloud can be obtained by parsing the bitstream. The decoding of the point cloud includes location decoding and attribute decoding. The process of location decoding includes the following. Arithmetic decoding is performed on a geometry bitstream, synthesis is performed after construction of an octree, and the location information of the points is reconstructed to obtain reconstructed information of the location information of the points; and coordinate transform is performed on the reconstructed information of the location information of the points to obtain the location information of the points. The location information of the points may also be referred to as geometry information of the points. The process of attribute decoding includes the following. An attribute bitstream is parsed to obtain residual values of the attribute information of the points in the point cloud. Inverse quantization is performed on the residual values of the attribute information of the points to obtain the inverse-quantized residual values of the attribute information of the points. Based on the reconstructed information of the location information of the points obtained during location decoding, one of three prediction modes is selected for point cloud prediction, so as to obtain reconstructed attribute values of the points. Inverse color-space transform is performed on the reconstructed attribute values of the points to obtain the decoded point cloud.

As illustrated in FIG. 12, the location decoding can be implemented with the following units: a first arithmetic decoding unit 201, an octree synthesis unit 202, a geometry reconstruction unit 203, and an inverse coordinate transform unit 204. The attribute decoding can be implemented with the following units: a second arithmetic decoding unit 210, an inverse quantization unit 211, an RAHT unit 212, a predicting transform unit 213, a lifting transform unit 214, and an inverse color-space transform unit 215.

It may be noted that, decompression is the inverse process of compression, and similarly, for the functions of various units in the decoding framework 200, reference can be made to the functions of corresponding units in the encoding framework 100. For example, in the decoding framework 200, the point cloud can be partitioned into multiple LODs according to Euclidean distances between points in the point cloud, and then attribute information of the points in the LODs is decoded sequentially. For example, the number of zeros (zero_cnt) in zero run-length coding technology is calculated to decode a residual based on zero_cnt. Next, in the decoding framework 200, inverse quantization can be performed based on the decoded residual value, and a reconstructed value of the point cloud is obtained by adding the inverse-quantized residual value and a predicted value of a current point, until the whole point cloud is decoded. The current point will be used as the nearest neighbour of a subsequent point in the LOD, and the reconstructed value of the current point will be used to predict attribute information of the subsequent point.

In the arithmetic encoding process, the encoder can use spatial correlation between the current node to be encoded and surrounding nodes for intra prediction of occupancy bits. Then, the encoder selects a corresponding binary arithmetic encoder for arithmetic encoding based on a predicted result, so as to implement CABAC and thus obtain the geometry bitstream.

For example, by storing coded nodes prior to the current node, the encoder can determine a first index of the current node based on planar information of a previous coded node located on a certain plane and a distance between the previous coded node and the current node, and thus can determine a context index based on the determined first index. Then, the encoder encodes the current node based on the obtained context index. Specifically, if the planar information of the previous coded node is 0, the decoder determines the first index of the current node as 0. If the planar information of the previous coded node is 1, the decoder determines the first index of the current node as 1. Otherwise, the decoder determines the first index of the current node as −1.

When the first index of the current node is determined as −1, it is determined that the current node does not satisfy any planar mode. When the first index of the current node is determined as 1, it is determined that the current node satisfies a planar mode of k=1. When the first index of the current node is determined as 0, it is determined that the current node satisfies a planar mode of k=0. When it is determined that the current node satisfies the planar mode of k=0, it is determined that there are occupied child nodes of the current node on the plane of k=0. When it is determined that the current node satisfies the planar mode of k=1, it is determined that there are occupied child nodes of the current node on the plane of k=1.

However, the accuracy of the determination of the first index of the current node based on planar information of the coded nodes is low, and thus the coding performance is reduced. For example, in the Morton order-based encoding order, the previous coded node is not necessarily a neighbouring node of the current node. In this case, the accuracy of the determination of the first index of the current node based on the planar information of the coded nodes is low. In view of this, a method and apparatus for index determination, a decoder, and an encoder are provided in embodiments of the disclosure, which can improve the accuracy of the first index and thus improve the coding performance.

Figure 13:
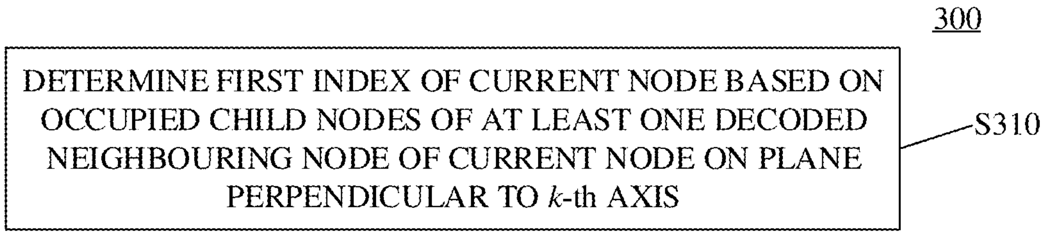
FIG. 13 is a schematic flowchart of a method for index determination provided in embodiments of the disclosure.

FIG. 13 is a schematic flowchart of a method 300 for index determination provided in embodiments of the disclosure. It may be understood that, the method 300 for index determination may be performed by a decoder, for example, applied to the decoding framework 200 illustrated in FIG. 12. For ease of illustration, the following takes the decoder as an example for illustration.

As illustrated in FIG. 13, the method 300 for index determination may include the following.

At S310, the decoder determines a first index of a current node based on occupied child nodes of at least one decoded neighbouring node of the current node on a plane perpendicular to a k-th axis.

In this embodiment, the first index of the current node is determined based on occupied child nodes of at least one coded neighbouring node of the current node on the plane perpendicular to the k-th axis, so that the first index of the current node will not be predicted directly based on planar information of coded nodes. As such, the first index of the current node can be determined better and more accurately based on spatial correlation between the current node and the at least one neighbouring node, thereby improving the accuracy of the first index and further improving the coding performance.

In this embodiment, the first index of the current node is determined based on the occupied child nodes of the at least one decoded neighbouring node of the current node on the plane perpendicular to the k-th axis, which can achieve decoding performance gains. In combination with Table 2 and Table 3, the following will describe results obtained by testing the solution provided in the disclosure on a test platform. Table 2 illustrates bit distortion (BD)-rates under lossy compression of geometry information. The BD-rate under lossy compression of geometry information represents the percentage of the bitrate saved (negative BD-Rate) or increased (positive BD-Rate) achieved with the technical solution provided in the disclosure compared to the bitrate achieved without the technical solution provided in the disclosure, under the same coding quality. Table 3 illustrates bpip ratios under lossless compression of geometry information. The bpip ratio under lossless compression of geometry information represents the percentage of the bitrate achieved with the technical solution provided in the disclosure to the bitrate achieved without the technical solution provided in the disclosure, with no loss of point cloud quality, where the lower the numerical value of the bpip ratio, the greater the bitrate savings during coding with the solution provided in the disclosure.

TABLE 2

| Test sequence | BD-total rate (%) D1 | BD-total rate (%) D2 |
|---|---|---|
| Cat1-A average | −0.1% | −0.1% |
| Cat1-B average | −0.6% | −0.6% |
| Cat3-fused average | −0.5% | −0.5% |
| Cat3-frame average | 0.0% | 0.0% |
| Overall average | −0.3% | −0.3% |

As illustrated in Table 2, Cat1-A represents a point cloud of points having only reflectance information of the points, and Cat1-A average represents an average BD-rate of respective components of Cat1A under lossy compression of geometry information. Cat1-B represents a point cloud of points having only color information of the points, and Cat1-B average represents an average BD-rate of respective components of Cat1-B under lossy compression of geometry information. Cat3-fused and Cat3-frame each represent a point cloud of points having color information and other attribute information of the points. Cat3-fused average represents an average BD-rate of respective components of Cat3-fused under lossy compression of geometry information, Cat3-frame average represents an average BD-rate of respective components of Cat3-frame under lossy compression of geometry information, and an overall average represents an average BD-rate of Cat1-A to Cat3-frame under lossy compression of geometry information. D1 represents BD-rates under the same point-to-point error, and D2 represents BD-rates under the same point-to-plane error. As can be seen from Table 2, the method for index determination provided in the disclosure achieves significant performance improvement for Cat1-A, Cat3-frame, and Cat1-B.

TABLE 3

| Test sequence | Bpip ratio (%) D1 |
|---|---|
| Cat1-A average | 96.9% |
| Cat1-B average | 99.4% |
| Cat3-fused average | 99.4% |
| Cat3-frame average | 100.0% |
| Overall average | 99.2% |

As can be seen from Table 3, the method for index determination provided in the disclosure achieves performance improvement for each of Cat1-A, Cat3-frame, and Cat1-B. It may be understood that, the name of the first index involved in the disclosure is not limited.

For example, in other alternative embodiments, the first index of the current node determined by the decoder based on the occupied child nodes of the at least one decoded neighbouring node of the current node on the plane perpendicular to the k-th axis may also be referred to as a planar mode flag occ_plane_pos[k] of the current node on the k-th axis, planar contextualization of occ_plane_pos[k], or an expression or variable determined according to the occupied child nodes of the at least one decoded neighbouring node of the current node on the plane perpendicular to the k-th axis. In addition, the occupied child nodes of the at least one neighbouring node may also be equivalent to child nodes whose occupancy bits indicate non-empty in the at least one neighbouring node or may be referred to as terms having a similar meaning, which is not limited in the disclosure.

The decoder can determine the occupied child nodes of the at least one decoded neighbouring node based on an occupancy bit of each child node of the at least one decoded neighbouring node of the current node on the plane perpendicular to the k-th axis. In other words, the decoder can predict the first index of the current node based on occupancy bits (or information) of child nodes of the at least one decoded neighbouring node of the current node on the plane perpendicular to the k-th axis.

Exemplarily, a location of an index involved in the disclosure will be described below in combination with Table 4.

TABLE 4

```
if(octree__planar__enabled)
   for(k = 0; k < 3; k++)
      if(PlanarEligible[k]) {
         occ single plane[k]
         if(occ single plane[k])
            occ plane__pos[k]
}
```

As illustrated in Table 4, occtree_planar_enabled indicates whether a planar mode is allowed for a current point cloud. If occtree_planar_enabled is true, the decoder obtains PlanarEligible[k] by traversing the k-th axis, where PlanarEligible[k] indicates whether the planar mode is allowed for the current point cloud on the k-th axis. Optionally, when the value of k is 0, 1, or 2, it indicates the S-axis, T-axis, or V-axis respectively. If PlanarEligible[k] is true, the decoder obtains occ_single_plane[k], where occ_single_plane[k] indicates whether the planar mode is allowed for the current node on the k-th axis. If occ_single_plane[k] is true, the decoder can determine the planar mode flag occ_plane_pos [k] based on the at least one decoded neighbouring node of the current node on the plane perpendicular to the k-th axis.

Exemplarily, Table 5 illustrates a correspondence between k and a planar axis.

TABLE 5

| k | Planar axis | Plane axes |
|---|---|---|
| 0 | S | T-V |
| 1 | T | S-V |
| 2 | V | S-T |

In some embodiments, operations at S310 may include the following. If the at least one decoded neighbouring node is non-empty, the decoder determines the first index based on the occupied child nodes of the at least one decoded neighbouring node.

Exemplarily, if any one of the at least one decoded neighbouring node is non-empty, the decoder determines the first index based on the occupied child nodes of the at least one decoded neighbouring node.

Exemplarily, if the at least one decoded neighbouring node includes only one non-empty decoded neighbouring node and the one non-empty decoded neighbouring node includes multiple occupied child nodes, the decoder determines the first index based on the occupied child nodes of the at least one decoded neighbouring node.

Exemplarily, if the at least one decoded neighbouring node includes one or more non-empty decoded neighbouring nodes, the decoder determines the first index based on the occupied child nodes of the at least one decoded neighbouring node.

In some embodiments, the operations at S310 may include the following. If the occupied child nodes of the at least one decoded neighbouring node are all distributed on a first plane perpendicular to the k-th axis, the decoder determines the first index as a first value. If the occupied child nodes of the at least one decoded neighbouring node are all distributed on a second plane perpendicular to the k-th axis, the decoder determines the first index as a second value. Otherwise, the decoder determines the first index as a third value.

Exemplarily, the first plane may be a high plane, and the second plane may be a low plane.

Exemplarily, the first plane may be a plane of k=1, and the second plane is a plane of k=0.

Exemplarily, the decoder can determine the first index based on a plane(s) where the occupied child nodes of the at least one decoded neighbouring node are located. If the occupied child nodes of the at least one decoded neighbouring node are distributed in the same plane, the decoder determines the first index based on the same plane. For example, if the same plane is the first plane, the first index is determined as the first value. If the same plane is the second plane, the first index is determined as the second value. If the occupied child nodes of the at least one decoded neighbouring node are not distributed in the same plane, the first index is determined as the third value.

Exemplarily, the decoder first determines whether the occupied child nodes of the at least one decoded neighbouring node are all distributed on the first plane. If the occupied child nodes of the at least one decoded neighbouring node are all distributed on the first plane, the decoder determines the first index as the first value. If the occupied child nodes of the at least one decoded neighbouring node are not all distributed on the first plane, the decoder determines whether the occupied child nodes of the at least one decoded neighbouring node are all distributed on the second plane. If the occupied child nodes of the at least one decoded neighbouring node are all distributed on the second plane, the decoder determines the first index as the second value. If the occupied child nodes of the at least one decoded neighbouring node are not all distributed on the second plane, the decoder determines the first index as the third value.

Exemplarily, the decoder first determines whether the occupied child nodes of the at least one decoded neighbouring node are all distributed on the second plane. If the occupied child nodes of the at least one decoded neighbouring node are all distributed on the second plane, the decoder determines the first index as the second value. If the occupied child nodes of the at least one decoded neighbouring node are not all distributed on the second plane, the decoder determines whether the occupied child nodes of the at least one decoded neighbouring node are all distributed on the first plane. If the occupied child nodes of the at least one decoded neighbouring node are all distributed on the first plane, the decoder determines the first index as the first value. If the occupied child nodes of the at least one decoded neighbouring node are not all distributed on the first plane, the decoder determines the first index as the third value.

In some embodiments, the method 300 may further include the following. The decoder determines a second index of the current node based on a distance between the at least one decoded neighbouring node and the current node.

In some embodiments, the decoder determines the second index as a fourth value.

Exemplarily, if the decoder determines the first index based on the occupied child nodes of the at least one decoded neighbouring node, the decoder directly determines the second index as the fourth value.

Exemplarily, the fourth value is a pre-defined value.

Exemplarily, the "pre-defined" can be implemented by pre-storing corresponding codes or tables in a device (for example, including the decoder and the encoder) or in other manners for indicating related information, and the disclosure is not limited in this regard. For example, the predefined value may refer to a value defined in a protocol. Optionally, the “protocol” may refer to a standard protocol in the field of coding technologies, which may include, for example, a VCC protocol, an ECM protocol, or other related protocols.

In some embodiments, the fourth value being 0 indicates that the distance between the at least one decoded neighbouring node and the current node is less than or equal to a preset threshold.

In some embodiments, the fourth value being 0 indicates that the at least one decoded neighbouring node is within a preset zone of the current node.

In other alternative embodiments, the fourth value may also be another value, and a specific value of the fourth value is not limited in the disclosure.

In some embodiments, the distance between the at least one decoded neighbouring node and the current node is a Manhattan distance.

In other alternative embodiments, the distance between the at least one decoded neighbouring node and the current node may also be another type of distance, such as a Euclidean distance or a Morton distance, which is not limited in the disclosure.

In some embodiments, the method 300 may further include the following. If the at least one decoded neighbouring node is empty, the decoder determines a third index based on planar information of a previous decoded node of the current node on the plane perpendicular to the k-th axis.

Exemplarily, the planar information of the previous decoded node may also refer to a plane where occupied child nodes of the previous decoded node are located and which is perpendicular to the k-th axis. For example, the plane where the occupied child nodes of the previous decoded node are located and which is perpendicular to the k-th axis may be the first plane (for example, the high plane or the plane of k=1). For example, the plane where the occupied child nodes of the previous decoded node are located and which is perpendicular to the k-th axis may be the second plane (for example, the low plane or the plane of k=0).

In some embodiments, the operations at S310 may include the following. If the planar information is 1, the decoder determines the third index as a first value. If the planar information is not 1, the decoder determines the third index as a second value.

Exemplarily, if the plane where the occupied child nodes of the previous decoded node are located and which is perpendicular to the k-th axis is the first plane (for example, the high plane or the plane of k=1), the decoder determines the third index as the first value. If the plane where the occupied child nodes of the previous decoded node are located and which is perpendicular to the k-th axis is not the first plane (for example, the high plane or the plane of k=1), the decoder determines the third index as the second value.

In some embodiments, the operations at S310 may include the following. If the planar information is 0, the decoder determines the third index as a second value. If the planar information is not 0, the decoder determines the third index as a first value.

In some embodiments, the method 300 may further include the following. The decoder determines a fourth index of the current node based on a distance between the previous decoded node and the current node.

Exemplarily, if the decoder determines the third index based on the planar information of the previous decoded node of the current node on the plane perpendicular to the k-th axis, the decoder may determine the fourth index of the current node based on the distance between the previous decoded node and the current node.

In some embodiments, the decoder obtains a number (a serial number) n of an octree depth level on which a planar mode is enabled, and determines the fourth index based on n.

Exemplarily, octree depth levels on which the planar mode is enabled for the current point cloud are consecutive.

Exemplarily, when the number of octree partition levels of the current point cloud is m, if the planar mode is enabled from the 1-th level and the octree depth levels on which the planar mode is enabled for the current point cloud are consecutive, then n=1 for the t-th level, n=2 for the (t+1)-th level, and so forth, n=m−t+1 for the m-th level.

Exemplarily, when the number of octree partition levels of the current point cloud is 10, if the planar mode is enabled from the 5th level and the octree depth levels on which the planar mode is enabled for the current point cloud are consecutive, then n=1 for the 5th level, n=2 for the 6th level, n=3 for the 7th level, n=4 for the 8th level, n=5 for the 9th level, and n=6 for the 10th level.

In some embodiments, if the distance between the previous decoded node and the current node is less than or equal to $2^n$, the decoder determines the fourth index as a fifth value. If the distance between the previous decoded node and the current node is greater than $2^n$, the decoder determines fourth index as a sixth value.

In some embodiments, the fifth value is 0 and indicates that the distance between the previous decoded node and the current node is less than or equal to a preset threshold or the previous decoded node is within a preset zone of the current node; and/or the sixth value is 1 and indicates that the distance between the previous decoded node and the current node is greater than the preset threshold or the previous decoded node is not within the preset zone of the current node.

In other alternative embodiments, the fifth value or the sixth value may also take another value. It only needs to be ensured in the solution of the disclosure that the fifth value is different from the sixth value, and a specific value of the fifth value or the sixth value is not limited.

In other embodiments, the fourth index can also be determined based on n in other manners, and the disclosure is not limited in this regard. For example, the fourth index can be determined by directly comparing the distance between the previous decoded node and the current node with n. For another example, the fourth index can be determined by directly comparing the distance between the previous decoded node and the current node with another n-related function value.

In some embodiments, the distance between the previous decoded node and the current node is a Manhattan distance.

In some embodiments, the first value is 1, the second value is 0, and the third value is −1.

In other alternative embodiments, the first value, the second value, or the third value may also take another value. It only needs to be ensured in the solution of the disclosure that the first value, the second value, and the third value are different from each other, and a specific value of the first value, the second value, or the third value is not limited.

In some embodiments, when the first index is the first value, it is determined that the current node satisfies a planar mode for the first plane (for example, the high plane or the plane of k=1). When the first index is the second value, it is determined that the current node satisfies a planar mode for the second plane (for example, the low plane or the plane of k=0). When the first index is the third value, it is determined that the current node does not satisfy any planar mode.

Exemplarily, when the decoder determines the first index as the first value, it indicates that the decoder may predict that the current node satisfies the planar mode for the first plane (for example, the high plane or the plane of k=1). When the decoder determines the first index as the second value, it indicates that the decoder may predict that the current node satisfies the second planar mode. When the decoder determines the first index as the third value, it indicates that the decoder may predict that the current node does not satisfy any planar mode for the second plane (for example, the low plane or the plane of k=0). When the decoder predicts that the current node satisfies the planar mode for the second plane (for example, the low plane or the plane of k=0), the decoder may predict that there are occupied child nodes on the second plane (for example, the low plane or the plane of k=0) in the current node. When the decoder predicts that the current node satisfies the planar mode for the first plane (for example, the high plane or the plane of k=1), the decoder may predict that there are occupied child nodes on the first plane (for example, the high plane or the plane of k=1) in the current node. When the decoder predicts that the current node does not satisfy any planar mode, the decoder may predict that no occupied child node exists in the current node or occupied child nodes in the current node are not all distributed on one plane.

In some embodiments, a value of k is 0, 1, or 2.

Exemplarily, when the value of k is 0, 1, or 2, it indicates the S-axis, T-axis, or V-axis respectively.

Exemplarily, the decoder may determine an index of the current node on the S-axis based on occupied child nodes of at least one decoded neighbouring node of the current node on a plane perpendicular to the S-axis. The decoder may also determine an index of the current node on the T-axis based on occupied child nodes of at least one decoded neighbouring node of the current node on a plane perpendicular to the T-axis. The decoder may further determine an index of the current node on the V-axis based on occupied child nodes of at least one decoded neighbouring node of the current node on a plane perpendicular to the V-axis. In other words, the first index determined by the decoder may include one or more of the index of the current node on the S-axis, the index of the current node on the T-axis, or the index of the current node on the V-axis.

In some embodiments, the at least one decoded neighbouring node includes a decoded node(s) adjacent to the current node.

Figure 14:
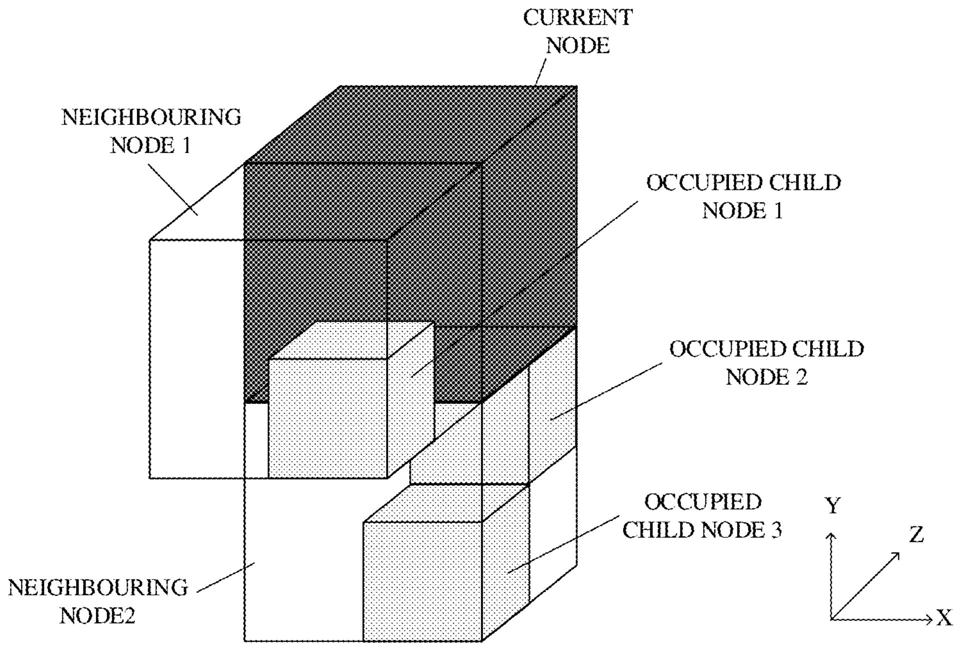
FIG. 14 is an example of occupied child nodes of neighbouring nodes on an S-axis provided in embodiments of the disclosure.

For example, the decoder first determines whether the occupied child nodes of the at least one decoded neighbouring node are all distributed on the first plane and then determines whether the occupied child nodes of the at least one decoded neighbouring node are all distributed on the second plane, based on which the method for determining the index of the current node will be exemplified with reference to FIG. 14.

FIG. 14 is an example of occupied child nodes of neighbouring nodes in an x-direction provided in embodiments of the disclosure.

As illustrated in FIG. 14, the decoder determines a first index of a current node based on occupied child nodes of at least one decoded neighbouring node of the current node on a plane perpendicular to the x-direction. The at least one decoded neighbouring node of the current node on the plane perpendicular to the x-direction includes neighbouring node 1 and neighbouring node 2. Neighbouring node 1 has occupied child node 1, and neighbouring node 2 has occupied child node 2 and occupied child node 3. Since occupied child node 1, occupied child node 2, and occupied child node 3 are all distributed on a plane of x=0, the decoder can predict the first index of the current node to be the second value. For example, the decoder can determine the first index of the current node as 0.

Figure 15:
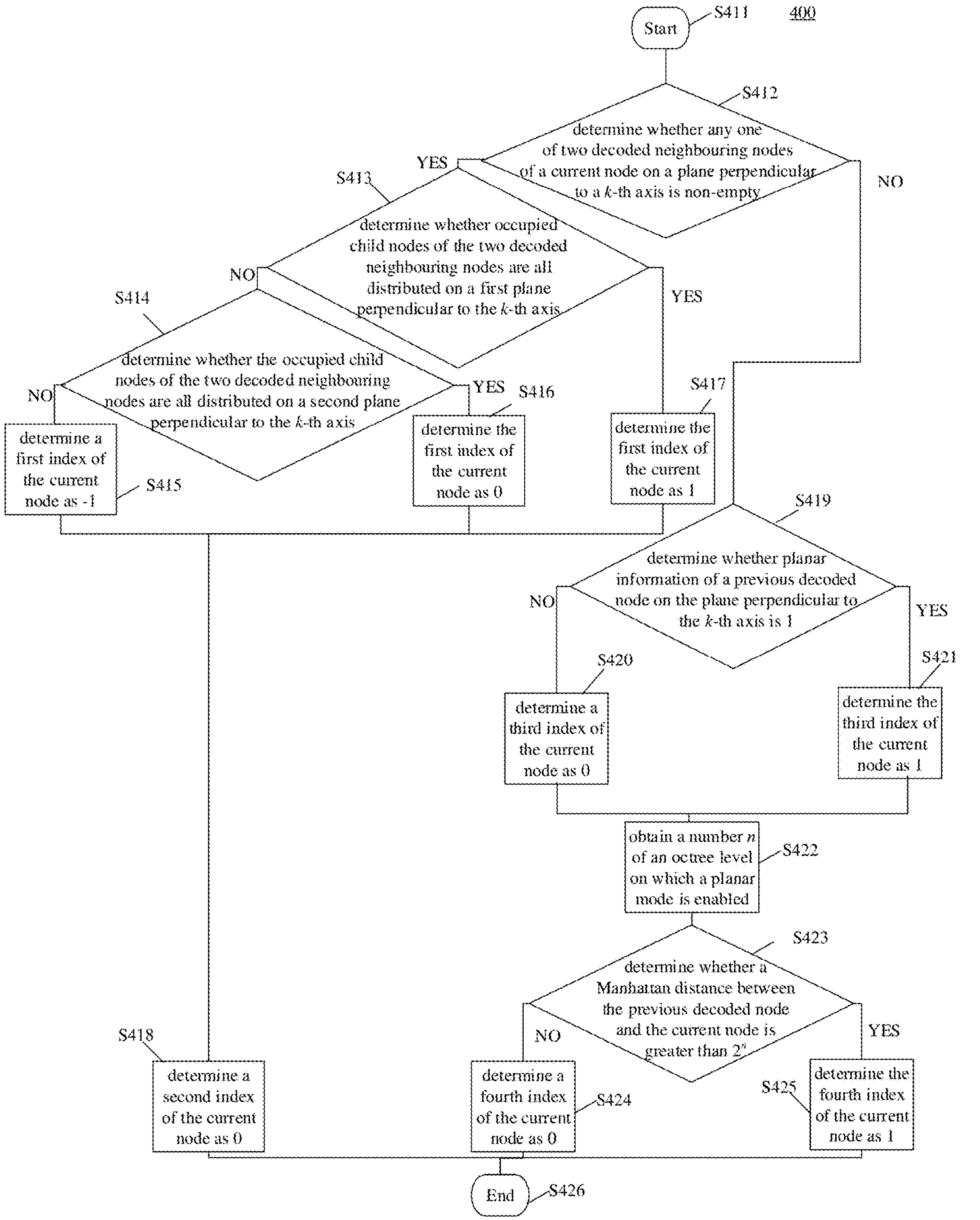
FIG. 15 is another schematic flowchart of a method for index determination provided in embodiments of the disclosure.

FIG. 15 is a schematic flowchart of a method 400 for index determination provided in embodiments of the disclosure. It may be understood that the method 400 for index determination may be performed by a decoder, for example, applied to the decoding framework 200 illustrated in FIG. 12. For ease of illustration, the following takes the decoder as an example for illustration.

At S411, start.

At S412, the decoder determines whether any one of two decoded neighbouring nodes of a current node on a plane perpendicular to a k-th axis is non-empty.

At S413, if any one of the two decoded neighbouring nodes of the current node on the plane perpendicular to the k-th axis is non-empty, the decoder determines whether occupied child nodes of the two decoded neighbouring nodes are all distributed on a first plane perpendicular to the k-th axis.

At S414, if the occupied child nodes of the two decoded neighbouring nodes are not all distributed on the first plane, the decoder determines whether the occupied child nodes of the two decoded neighbouring nodes are all distributed on a second plane perpendicular to the k-th axis.

At S415, if the occupied child nodes of the two decoded neighbouring nodes are not all distributed on the second plane, the decoder determines a first index of the current node as −1.

At S416, if the occupied child nodes of the two decoded neighbouring nodes are all distributed on the second plane, the decoder determines the first index of the current node as 0.

At S417, if the occupied child nodes of the two decoded neighbouring nodes are all distributed on the first plane, the decoder determines the first index of the current node as 1.

At S418, the decoder determines a second index of the current node as 0.

At S419, if the two decoded neighbouring nodes of the current node on the plane perpendicular to the k-th axis are both empty, the decoder determines whether planar information of a previous decoded node on the plane perpendicular to the k-th axis is 1.

At S420, if the planar information of the previous decoded node on the plane perpendicular to the k-th axis is not 1, the decoder determines a third index of the current node as 0.

At S421, if the planar information of the previous decoded node on the plane perpendicular to the k-th axis is 1, the decoder determines the third index of the current node as 1.

At S422, the decoder obtains a number n of an octree level on which a planar mode is enabled.

At S423, the decoder determines whether a Manhattan distance between the previous decoded node and the current node is greater than $2^n$.

At S424, if the Manhattan distance between the previous decoded node and the current node is less than or equal to $2^n$, the decoder determines a fourth index of the current node as 0.

At S425, if the Manhattan distance between the previous decoded node and the current node is greater than $2^n$, the decoder determines the fourth index of the current node as 1.

At S426, end.

It may be understood that, FIG. 15 is merely an example of the disclosure and may not be construed as a limitation of the disclosure.

For example, in other alternative embodiments, the decoder may first determine whether the occupied child nodes of the two decoded neighbouring nodes are all distributed on the second plane, and then determine whether the occupied child nodes of the two decoded neighbouring nodes are all distributed on the first plane if the occupied child nodes of the two decoded neighbouring nodes are not all distributed on the second plane. Alternatively, the decoder may simultaneously determine whether the occupied child nodes of the two decoded neighbouring nodes are all distributed on the second plane or are all distributed on the first plane. The disclosure is not limited in this regard.

In some embodiments, the method 400 may also include the following. The decoder decodes the current node based on the first index.

Exemplarily, the decoder may determine a context index of the current node based on the first index, and decode the current node based on the context index of the current node.

Exemplarily, the decoder may determine the context index of the current node based on the first index and the second index involved above.

Exemplarily, the decoder may determine the context index of the current node based on the third index involved above.

Exemplarily, the decoder may determine the context index of the current node based on the third index and the fourth index involved above.

Exemplarily, after determining or obtaining one or more of an index of the current node on the S-axis, an index of the current node on the T-axis, or an index of the current node on the V-axis, the decoder can determine the context index of the current node based on one or more of the index of the current node on the S-axis, the index of the current node on the T-axis, or the index of the current node on the V-axis and decode the current node based on the context index of the current node.

Exemplarily, after determining the context index of the current node, the decoder can determine an arithmetic decoder for arithmetic decoding of the current node based on the context index of the current node, and perform arithmetic decoding on the current node based on the determined arithmetic decoder, so as to obtain geometry information of the current node.

It may be noted that in embodiment of the disclosure, each of the first index, the second index, the third index, and the fourth index may be an intermediate index or intermediate variable for determining the context index of the current node.

For example, in other alternative embodiments, the first index and the third index may be referred to as one type of indexes. Alternatively, the first index and the third index may also be combined into one index, which may be referred to as, for example, a planar index. Exemplarily, if the at least one decoded neighbouring node is non-empty, the planar index is determined based on the occupied child nodes of the at least one decoded neighbouring node. If the at least one decoded neighbouring node is empty, the planar index is determined based on the planar information of the previous decoded node of the current node on the plane perpendicular to the k-th axis.

For another example, in other alternative embodiments, the second index and the fourth index may be referred to as one type of indexes. Alternatively, the second index and the fourth index may also be combined into one index, which may be referred to as, for example, a distance index. Exemplarily, if the at least one decoded neighbouring node is non-empty or the decoder determines the above first index based on the occupied child nodes of the at least one decoded neighbouring node, then the decoder determines the distance index as a preset value (for example, 0). If the at least one neighbouring node is empty or the decoder determines the above third index based on the planar information of the previous decoded node of the current node on the plane perpendicular to the k-th axis, then the decoder determines the distance index based on the distance between the previous decoded node and the current node.

That is, the terms "the first index", "the second index", "the third index", and "the fourth index" are merely used to distinguish these indexes from each other, and the number and type of indexes are not limited. That is, the scope of embodiments of the disclosure is not limited in this regard.

In combination with the solution provided in the disclosure, the following will give an exemplary illustration of data processing procedure involved in the standard documents and variables used in the spec.

Information of occupied child nodes of a neighbouring node(s) or a previous coded node that is eligible for a planar coding mode on the plane perpendicular to the k-th axis is needed to determine a context index of a flag occ_plane_pos [k]. The information includes a Manhattan distance between a current node and the node, and values for occ_single_plane and occ_plane pos.

A plane perpendicular to a k-th axis of a coded node is identified by a location of the coded node along the axis modulo $2^{14}$.

PlanarNodeAxisLoc[k] indicates a plane of the current node perpendicular to the k-th axis and is obtained based on location coordinates of the current node in an octree of a current level.

ManhattanDist [k] indicates the Manhattan distance from the current node to the origin of coordinates on the plane perpendicular to the k-th axis and is obtained by adding coordinate values on the plane perpendicular to the k-th axis:

$$\begin{aligned}&\text{Manhattan}\,Dist[k] := \\ &k == 0\,?\,Nt + Nv : \\ &k == 1\,?\,Ns + Nv : \\ &k == 2\,?\,Ns + Nt : na\end{aligned}$$

Information of the previous coded node that is eligible for the planar coding mode is stored via the following variables, where k and axisLoc may be used to determine a location of the plane perpendicular to the k-th axis:

- array PrevManhattanDist, where PrevManhattanDist[k] [axisLoc] indicates the Manhattan distance from the previous coded node that is eligible for the planar coding mode to the origin of coordinates on the plane perpendicular to the k-th axis;
- array PrevOccSinglePlane, where PrevOccSinglePlane[k] [axisLoc] indicates whether the previous coded node that is eligible for the planar coding mode satisfies the planar coding mode; and
- array PrevOccPlanePos, where PrevOccPlanePos[k][axisLoc] indicates a plane location of the previous coded node that is eligible for the planar coding mode.

After each occupancy_tree_node syntax structure, the state shall be updated for each planar-eligible axis:

```
for (k = 0; k < 3; k++)
  if (PlanarEligible[k]) {
     PrevManhattanDist[k][PlanarNodeAxisLoc[k]] = ManhattanDist[k]
    PrevOccSinglePlane[k][PlanarNodeAxisLoc[k]] = occ_single_plane[k]
   if (occ_single_plane[k])
        PrevOccPlanePos[k][PlanarNodeAxisLoc[k]] = occ_plane_pos[k]
}
```

That is, after the planar coding mode is applied to the current node, for each k-axis, the above three variables need to be updated respectively based on information of the current node.

Contextualization of occ_plane_pos[k] for a node(s) that does not satisfy any condition of angular contextualization (AngularEligible is 0) is specified by the expression CtxIdxPlanePos:

Contextualization of occ_plane_pos[k] for nodes not eligible for angular contextualization (AngularEligible is 0) is specified by the expression CtxIdxPlanePos.

$$\begin{aligned} &CtxIdxPlanePos := isNeighOccupied\ \&\&\ \text{occtree\_adjacent\_child\_enabled} \\ &?\,(neighPlanePosCtxInc < 0\,?\,adjPlaneCtxInc : 12\times k + 4\times adjPlaneCtxInc + 2\times neighDisCtxInc + neighPlanePosCtxInc + 3) \\ &:(\text{occtree\_planar\_buffer\_disabled} \,\|\neg\, PrevOccSinglePlane[k]PlanarNodeAxisLoc[k]] \\ &?\,adjPlaneCtxInc \\ &: 12\times k + 4adjPlaneCtxInc + 2\times prevDistCtxInc + prevPlaneCtxInc + 3) \end{aligned}$$

A method for determining the context index of the flag occ_plane_pos[k] of the planar coding mode is as follows. When at least one neighbouring node is non-empty (isNeighOccupied is true) and information of child nodes of the neighbouring node is accessible (occtree_Adjacent_child_enabled is true), the context index of occ_plane_pos[k] is determined according to the first index neighPlanePosCtxInc and the second index neighDistCtxInc. Otherwise, the context index of occ_plane_pos[k] is determined according to the third index prevPlanePosCtxInc and the fourth index prevDistCtxInc.

The value of neighDistCtxInc (second index) is 0, and prevDistCtxInc (fourth index) is determined according to the Manhattan distance between the previous coded node and the current node.

$$prevDistCtxInc := \text{Abs}\,(a-b) > 2^{numEligiblePlanarLevels}$$

where a=PrevManhattanDist[k][PlanarNodeAxisLoc[k]]

b=ManhattanDist[k]

numEligiblePlanarLevels discriminates by the number of a level on which the planar mode is enabled.

If the Manhattan distance between the previous coded node and the current node is greater than 2 to the power of the number of an octree depth level on which the planar coding mode is enabled, the value is assigned to 1 and otherwise, the value is assigned to 0.

neighPlanePosCtxInc (the first index) is determined according to the occupied child nodes of the at least one neighbouring node.

prevPlanePosCtxInc (the third index) is determined according to the occupied plane location (the first plane, the second plane) of the previous coded node that is eligible for the planar coding mode.

The method for index determination according to embodiments of the disclosure has been described in detail above from a perspective of the decoder, and the method for index determination according to embodiments of the disclosure will be described below from a perspective of an encoder with reference to FIG. 16.

Figure 16:
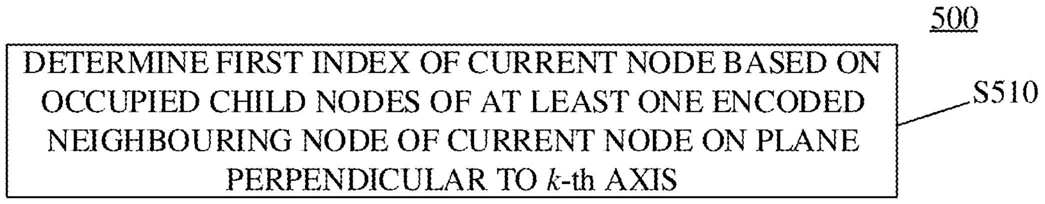
FIG. 16 is yet another schematic flowchart of a method for index determination provided in embodiments of the disclosure.

FIG. 16 is a schematic flowchart of a method 500 for index determination provided in embodiments of the disclosure. It may be understood that, the method 500 for index determination may be performed by an encoder, for example, applied to the encoding framework 100 illustrated in FIG. 4. For ease of illustration, the following takes the encoder as an example for illustration.

As illustrated in FIG. 16, the method 500 for index determination may include the following.

At S510, a first index of a current node is determined based on occupied child nodes of at least one encoded neighbouring node of the current node on a plane perpendicular to a k-th axis.

In some embodiments, operation at S510 may include the following. If the at least one encoded neighbouring node is non-empty, the first index is determined based on the occupied child nodes of the at least one encoded neighbouring node.

In some embodiments, if the occupied child nodes of the at least one encoded neighbouring node are all distributed on a first plane perpendicular to the k-th axis, the first index is determined as a first value. If the occupied child nodes of the at least one encoded neighbouring node are all distributed on a second plane perpendicular to the k-th axis, the first index is determined as a second value. Otherwise, the first index is determined as a third value.

In some embodiments, the method 500 may further include the following. A second index of the current node is determined based on a distance between the at least one encoded neighbouring node and the current node.

In some embodiments, the second index is determined as a fourth value.

In some embodiments, the fourth value being 0 indicates that the distance between the at least one encoded neighbouring node and the current node is less than or equal to a preset threshold or the at least one encoded neighbouring node is within a preset zone of the current node.

In some embodiments, the distance between the at least one encoded neighbouring node and the current node is a Manhattan distance.

In some embodiments, the method 500 may further include the following. If the at least one encoded neighbouring node is empty, a third index is determined based on planar information of a previous decoded node of the current node on the plane perpendicular to the k-th axis.

In some embodiments, if the planar information is 1, the third index is determined as a first value. If the planar information is not 1, the third index is determined as a second value.

In some embodiments, the method 500 may further include the following. A fourth index of the current node is determined based on a distance between the previous encoded node and the current node.

In some embodiments, a number n of an octree depth level on which a planar mode is enabled is obtained, and the fourth index is determined based on n.

In some embodiments, if the distance between the previous encoded node and the current node is less than or equal to $2^n$, the fourth index is determined as a fifth value. If the distance between the previous encoded node and the current node is greater than $2^n$, the fourth index is determined as a sixth value.

In some embodiments, the distance between the previous encoded node and the current node is a Manhattan distance.

In some embodiments, the first value is 1, the second value is 0, and the third value is −1.

In some embodiments, a value of k is 0, 1, or 2.

In some embodiments, the method 500 may further include the following. The current node is encoded based on the first index of the current node.

It may be understood that, the technical solution provided in embodiments of the disclosure can be applied to both the encoding end and the decoding end, that is, synchronization and consistency between the encoding end and the decoding end can be maintained. That is to say, For the detailed solution of the method 500 for index determination, reference can be made to related content of the method 300 for index determination, which will not be repeated herein.

Preferable embodiments of the disclosure have been described in detail above with reference to the accompanying drawings. However, the disclosure is not limited to the details described in the foregoing embodiments. Within the scope of the technical concept of the disclosure, various simple modifications can be made to the technical solutions of the disclosure, and these simple modifications all fall within the protection scope of the disclosure. For example, various technical features described in the foregoing embodiments may be combined in any suitable manner without contradiction, and in order to avoid unnecessary redundancy, various possible combinations are not further described in the disclosure. For another example, various embodiments of the disclosure may also be combined in any manner, and as long as the combinations do not depart from the idea of the disclosure, they may also be considered as contents disclosed in the disclosure. It may also be understood that, in various method embodiments of the disclosure, the magnitude of a sequence number of each of the foregoing processes does not mean an execution order, and an execution order of each process should be determined according to a function and an internal logic of the process, which shall not constitute any limitation to an implementation process of embodiments of the disclosure.

The method embodiments of the disclosure have been described in detail above, and the apparatus embodiments of the disclosure will be described in detail below with reference to FIG. 17 and FIG. 18.

Figure 17:
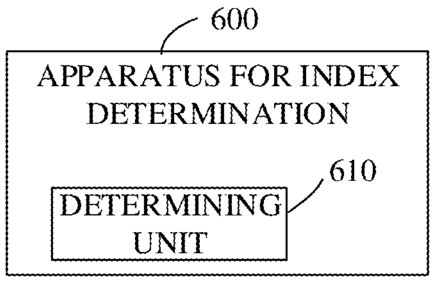
FIG. 17 is a schematic block diagram of an apparatus for index determination provided in embodiments of the disclosure.

FIG. 17 is a schematic block diagram of an apparatus 600 for index determination provided in embodiments of the disclosure.

As illustrated in FIG. 17. the apparatus 600 for index determination may include a determining unit 610. The determining unit 610 is configured to determine a first index of a current node based on occupied child nodes of at least one decoded neighbouring node of the current node on a plane perpendicular to a k-th axis.

In some embodiments, the determining unit 610 is specifically configured to determines the first index based on the occupied child nodes of the at least one decoded neighbouring node if the at least one decoded neighbouring node is non-empty.

In some embodiments, the determining unit 610 is specifically configured to determine the first index as a first value if the occupied child nodes of the at least one decoded neighbouring node are all distributed on a first plane perpendicular to the k-th axis, determine the first index as a second value if the occupied child nodes of the at least one decoded neighbouring node are all distributed on a second plane perpendicular to the k-th axis, and otherwise, determine the first index as a third value.

In some embodiments, the determining unit 610 is further configured to determine a second index of the current node based on a distance between the at least one decoded neighbouring node and the current node.

In some embodiments, the determining unit 610 is specifically configured to determine the second index as a fourth value.

In some embodiments, the fourth value being 0 indicates that the distance between the at least one decoded neighbouring node and the current node is less than or equal to a preset threshold or the at least one decoded neighbouring node is within a preset zone of the current node.

In some embodiments, the distance between the at least one decoded neighbouring node and the current node is a Manhattan distance.

In some embodiments, the determining unit 610 is further configured to determine a third index based on planar information of a previous decoded node of the current node on the plane perpendicular to the k-th axis, if the at least one decoded neighbouring node is empty.

In some embodiments, the determining unit 610 is specifically configured to determine the third index as a first value if the planar information is 1, and determine the third index as a second value if the planar information is not 1.

In some embodiments, the determining unit 610 is further configured to determine a fourth index of the current node based on a distance between the previous decoded node and the current node.

In some embodiments, the determining unit 610 is specifically configured to obtain a number n of an octree depth level on which a planar mode is enabled, and determine the fourth index based on n.

In some embodiments, the determining unit 610 is specifically configured to determine the fourth index as a fifth value if the distance between the previous decoded node and the current node is less than or equal to $2^n$, and determine the fourth index as a sixth value if the distance between the previous decoded node and the current node is greater than $2^n$.

In some embodiments, the distance between the previous decoded node and the current node is a Manhattan distance.

In some embodiments, the first value is 1, the second value is 0, and the third value is −1.

In some embodiments, a value of k is 0, 1, or 2.

In some embodiments, the determining unit 610 is further configured to decode the current node based on the first index of the current node.

Figure 18:
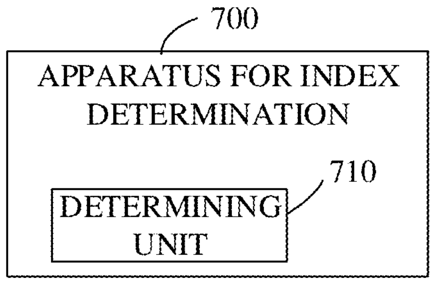
FIG. 18 is another schematic block diagram of an apparatus for index determination provided in embodiments of the disclosure.

FIG. 18 is a schematic block diagram of an apparatus 700 for index determination provided in embodiments of the disclosure.

As illustrated in FIG. 18. the apparatus 700 for index determination may include a determining unit 710. The determining unit 710 is configured to determine a first index of a current node based on occupied child nodes of at least one encoded neighbouring node of the current node on a plane perpendicular to a k-th axis.

In some embodiments, the determining unit 710 is specifically configured to determines the first index based on the occupied child nodes of the at least one encoded neighbouring node if the at least one encoded neighbouring node is non-empty.

In some embodiments, the determining unit 710 is specifically configured to determine the first index as a first value if the occupied child nodes of the at least one encoded neighbouring node are all distributed on a first plane perpendicular to the k-th axis, determine the first index as a second value if the occupied child nodes of the at least one encoded neighbouring node are all distributed on a second plane perpendicular to the k-th axis, and otherwise, determine the first index as a third value.

In some embodiments, the determining unit 710 is further configured to determine a second index of the current node based on a distance between the at least one encoded neighbouring node and the current node.

In some embodiments, the determining unit 710 is specifically configured to determine the second index as a fourth value.

In some embodiments, the fourth value being 0 indicates that the distance between the at least one encoded neighbouring node and the current node is less than or equal to a preset threshold or the at least one encoded neighbouring node is within a preset zone of the current node.

In some embodiments, the distance between the at least one encoded neighbouring node and the current node is a Manhattan distance.

In some embodiments, the determining unit 710 is further configured to determine a third index based on planar information of a previous encoded node of the current node on the plane perpendicular to the k-th axis, if the at least one encoded neighbouring node is empty.

In some embodiments, the determining unit 710 is specifically configured to determine the third index as a first value if the planar information is 1, and determine the third index as a second value if the planar information is not 1.

In some embodiments, the determining unit 710 is further configured to determine a fourth index of the current node based on a distance between the previous encoded node and the current node.

In some embodiments, the determining unit 710 is specifically configured to obtain a number n of an octree depth level on which a planar mode is enabled, and determine the fourth index based on n.

In some embodiments, the determining unit 710 is specifically configured to determine the fourth index as a fifth value if the distance between the previous encoded node and the current node is less than or equal to $2^n$, and determine the fourth index as a sixth value if the distance between the previous encoded node and the current node is greater than $2^n$.

In some embodiments, the distance between the previous encoded node and the current node is a Manhattan distance.

In some embodiments, the first value is 1, the second value is 0, and the third value is −1.

In some embodiments, a value of k is 0, 1, or 2.

In some embodiments, the determining unit 710 is further configured to encode the current node based on the first index of the current node.

It may be understood that, apparatus embodiments and method embodiments correspond to each other. For similar elaborations, reference can be made to the method embodiments, which will not be repeated herein. Specifically, the apparatus 600 for index determination illustrated in FIG. 17 may correspond to a corresponding entity for implementing the method 300 in embodiments of the disclosure, and the above and other operations and/or functions of various units of the apparatus 600 for index determination are respectively intended for implementing corresponding operations in the methods such as the method 300. The apparatus 700 for index determination illustrated in FIG. 18 may correspond to a corresponding entity for implementing the method 500 in embodiments of the disclosure, that is, the above and other operations and/or functions of various units of the apparatus 700 for index determination are respectively intended for implementing corresponding operations in the methods such as the method 500.

It may further be understood that, various units in the apparatus 600 for index determination or the apparatus 700 for index determination involved in embodiments of the disclosure may be separately or completely combined into one or more additional units, or some unit(s) may also be split into multiple functionally smaller units, which can implement the same operations without affecting the achievement of technical effects of embodiments of the disclosure. The above units are divided on the basis of logical functions. In practical applications, the function of one unit may also be implemented by multiple units, or the functions of the multiple units may be implemented by one unit. In other embodiments of the disclosure, the apparatus 600 for index determination or the apparatus 700 for index determination may also include other units. In practical applications, these functions may also be implemented with the assistance of other units, and may be implemented by cooperation of multiple units. According to another embodiment of the disclosure, the apparatus 600 for index determination or the apparatus 700 for index determination involved in embodiments of the disclosure may be constructed and the encoding method or the decoding method in embodiments of the disclosure may be implemented, by running a computer program (including program codes) capable of executing various operations involved in the corresponding methods on a general-purpose computing device of a general-purpose computer including a processing component and a storage component, such as a central processing unit (CPU), a random access memory (RAM), and a read-only memory (ROM). The computer program may be recorded, for example, on a computer-readable storage medium, loaded on an electronic device through the computer-readable storage medium, and run on the electronic device to implement corresponding methods in embodiments of the disclosure.

In other words, the units described above may be implemented by the form of hardware, or may be implemented by an instruction in the form of software, or may be implemented by a combination of hardware and software. Specifically, each step of the method embodiments of the disclosure may be completed by an integrated logic circuit of hardware in a processor and/or an instruction in the form of software. The steps of the method disclosed in embodiments of the disclosure may be directly implemented by a hardware decoding processor, or may be performed by hardware and software modules in the decoding processor.

Optionally, the software may be located in a storage medium mature in the skill such as an RAM, a flash memory, an ROM, a programmable ROM (PROM), or an electrically erasable programmable memory, registers, and the like. The storage medium is located in a memory. The processor reads the information in the memory, and completes the steps of the foregoing method embodiments with the hardware of the processor.

Figure 19:
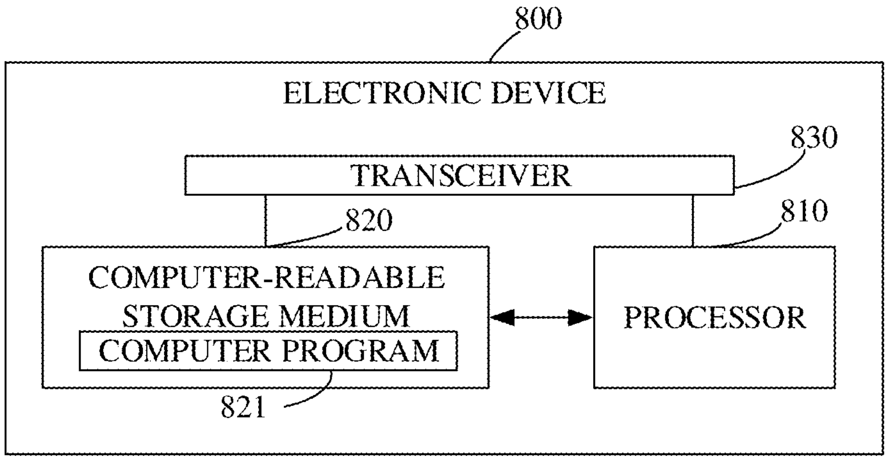
FIG. 19 is a schematic block diagram of an electronic device provided in embodiments of the disclosure.

FIG. 19 is a schematic structure diagram of an electronic device 800 provided in embodiments of the disclosure.

As illustrated in FIG. 19, the electronic device 800 includes a processor 810 and a computer-readable storage medium 820. The processor 810 and the computer-readable storage medium 820 may be connected via a bus or in other manners. The computer-readable storage medium 820 is configured to store a computer program 821. The computer program 821 includes computer instructions. The processor 810 is configured to execute the computer instructions stored in the computer-readable storage medium 820. The processor 810 is a computing core and a control core of the electronic device 800, which is adapted to implement one or more computer instructions and is specifically adapted to load and execute one or more computer instructions, so as to implement corresponding method processes or corresponding functions.

As an example, the processor 810 may also be referred to as a CPU. The processor 810 may be, but is not limited to, a general-purpose processor, a digital signal processor (DSP), an application specific integrated circuit (ASIC), a field programmable gate array (FPGA), or other programmable logic devices, discrete gates or transistor logic devices, discrete hardware components, or the like.

As an example, the computer-readable storage medium 820 may be a high-speed RAM or a non-volatile memory, for example, at least one disk memory. Optionally, the computer-readable storage medium 820 may also be at least one computer-readable storage medium far away from the foregoing processor 810. Specifically speaking, the computer-readable storage medium 820 includes, but is not limited to, a volatile memory and/or a non-volatile memory. The non-volatile memory may be an ROM, a PROM, an erasable PROM (EPROM), an electrically EPROM (EEPROM), or a flash memory. The volatile memory may be an RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DR RAM).

In an implementation, the electronic device 800 may be the encoder or the encoding framework involved in embodiments of the disclosure. The computer-readable storage medium 820 stores a first computer instruction. The processor 810 loads and executes the first computer instruction stored in the computer-readable storage medium 820, so as to implement corresponding operations in the encoding method provided in embodiments of the disclosure. In other words, the first computer instruction in the computer-readable storage medium 820 is loaded by the processor 810 to perform corresponding operations, which will not be repeated herein.

In an implementation, the electronic device 800 may be the decoder or the decoding framework involved in embodiments of the disclosure. The computer-readable storage medium 820 stores a second computer instruction. The processor 810 loads and executes the second computer instruction stored in the computer-readable storage medium 820, so as to implement corresponding operations in the decoding method provided in embodiments of the disclosure. In other words, the second computer instruction in the computer-readable storage medium 820 is loaded by the processor 810 to perform corresponding operations, which will not be repeated herein.

According to another aspect of the disclosure, a coding system is further provided in embodiments of the disclosure. The coding system includes the encoder and the decoder involved above.

According to another aspect of the disclosure, a computer-readable storage medium (memory) is further provided in embodiments of the disclosure. The computer-readable storage medium is a memory device in the electronic device 800, and is configured to store a program and data, for example, the computer-readable storage medium 820. It may be understood that, the computer-readable storage medium 820 herein may include both a built-in storage medium of the electronic device 800, and of course, an extended storage medium supported by the electronic device 800. The computer-readable storage medium provides storage space. The storage space stores an operating system of the electronic device 800. In addition, the storage space further stores one or more computer instructions that are adapted to be loaded and executed by the processor 810. These computer instructions may be one or more computer programs 821 (including program codes).

According to another aspect of the disclosure, a computer program product or a computer program is provided. The computer program product or the computer program includes computer instructions. The computer instructions are stored in a computer-readable storage medium, for example, a computer program 821. In this case, the electronic device 800 may be a computer. A processor 810 reads the computer instructions from the computer-readable storage medium 820, and the processor 810 executes the computer instructions to cause the computer to perform the above encoding or decoding method provided in various optional implementations.

In other words, when implemented by software, all or part of the functions can be implemented in the form of a computer program product. The computer program product includes one or more computer instructions. When the computer program instructions are loaded and executed on a computer, all or part of the operations or functions of the embodiments of the disclosure are performed. The computer may be a general-purpose computer, a special-purpose computer, a computer network, or other programmable apparatuses. The computer instruction may be stored in a computer-readable storage medium, or transmitted from one computer-readable storage medium to another computer-readable storage medium. For example, the computer instruction may be transmitted from one website, computer, server, or data center to another website, computer, server, or data center in a wired manner or in a wireless manner. Examples of the wired manner may be a coaxial cable, an optical fiber, a digital subscriber line (DSL), or the like. The wireless manner may be, for example, infrared, wireless, microwave, or the like.

Those of ordinary skill in the art will appreciate that units and operations of various examples described in connection with embodiments of the disclosure can be implemented by electronic hardware or by a combination of computer software and electronic hardware. Whether these functions are performed by means of hardware or software depends on the particular application and the design constraints of the technical solutions. Those skilled in the art may use different methods with regard to each particular application to implement the described functionality, but such methods may not be regarded as lying beyond the scope of the disclosure.

Finally, it may be noted that, the foregoing elaborations are merely implementations of the disclosure, but are not intended to limit the protection scope of the disclosure. Any variation or replacement easily thought of by those skilled in the art within the technical scope disclosed in the disclosure shall belong to the protection scope of the disclosure. Therefore, the protection scope of the disclosure shall be subject to the protection scope of the claims.

What is claimed is:

1. A method for index determination, applicable to a decoder and comprising:

determining a first index of a current node based on occupied child nodes of at least one decoded neighbouring node of the current node on a plane perpendicular to a k-th axis, if the at least one decoded neighbouring node is non-empty;

wherein determining-the first index based on the occupied child nodes of the at least one decoded neighbouring node comprises:

determining the first index as a first value, if the occupied child nodes of the at least one decoded neighbouring node are all distributed on a first plane perpendicular to the k-th axis;

determining the first index as a second value, if the occupied child nodes of the at least one decoded neighbouring node are all distributed on a second plane perpendicular to the k-th axis;

otherwise, determining the first index as a third value.

2. The method of claim 1, further comprising:

determining a second index of the current node based on a distance between the at least one decoded neighbouring node and the current node, wherein determining the second index of the current node based on the distance between the at least one decoded neighbouring node and the current node comprises:

determining the second index as a fourth value, wherein the fourth value being 0 indicates that the distance between the at least one decoded neighbouring node and the current node is less than or equal to a preset threshold or the at least one decoded neighbouring node is within a preset zone of the current node.

3. The method of claim 2, wherein the distance between the at least one decoded neighbouring node and the current node is a Manhattan distance.

4. The method of claim 1, further comprising:

determining a second index based on planar information of a previous decoded node of the current node on the plane perpendicular to the k-th axis, if the at least one decoded neighbouring node is empty.

5. The method of claim 4, wherein determining the second index based on the planar information of the previous decoded node of the current node on the plane perpendicular to the k-th axis comprises:

determining the second index as a first value, if the planar information is 1; and determining the second index as a second value, if the planar information is not 1.

6. The method of claim 4, further comprising:

determining a third index of the current node based on a distance between the previous decoded node and the current node.

7. The method of claim 6, wherein the distance between the previous decoded node and the current node is a Manhattan distance.

8. The method of claim 1, wherein the first value is 1, the second value is 0, and the third value is −1.

9. The method of claim 1, wherein a value of k is 0, 1, or 2.

10. A method for index determination, applicable to an encoder and comprising:

determining a first index of a current node based on occupied child nodes of at least one encoded neighbouring node of the current node on a plane perpendicular to a k-th axis, if the at least one encoded neighbouring node is non-empty;

wherein determining the first index based on the occupied child nodes of the at least one encoded neighbouring node comprises:

determining the first index as a first value, if the occupied child nodes of the at least one encoded neighbouring node are all distributed on a first plane perpendicular to the k-th axis;

determining the first index as a second value, if the occupied child nodes of the at least one encoded neighbouring node are all distributed on a second plane perpendicular to the k-th axis;

otherwise, determining the first index as a third value.

11. The method of claim 10, further comprising:

determining a second index of the current node based on a distance between the at least one encoded neighbouring node and the current node, wherein determining the second index of the current node based on the distance between the at least one encoded neighbouring node and the current node comprises:

determining the second index as a fourth value, wherein the fourth value being 0 indicates that the distance between the at least one encoded neighbouring node and the current node is less than or equal to a preset threshold or the at least one encoded neighbouring node is within a preset zone of the current node.

12. The method of claim 10, further comprising:

determining a second index based on planar information of a previous encoded node of the current node on the plane perpendicular to the k-th axis, if the at least one encoded neighbouring node is empty; and determining a third index of the current node based on a distance between the previous encoded node and the current node, wherein determining the second index based on the planar information of the previous encoded node of the current node on the plane perpendicular to the k-th axis comprises:

determining the second index as a first value, if the planar information is 1; and determining the second index as a second value, if the planar information is not 1.

13. The method of claim 10, wherein the first value is 1, the second value is 0, and the third value is −1.

14. The method of claim 10, wherein a value of k is 0, 1, or 2.

15. A decoder, comprising:

a processor adapted to execute a computer program; and a computer-readable storage medium storing the computer program which, when executed by the processor, is operable to implement the method of claim 1.

16. An encoder, comprising:

a processor adapted to execute a computer program; and a computer-readable storage medium storing the computer program which, when executed by the processor, is operable to implement the method of claim 10.

* * * * *